(12) United States Patent
Dai et al.

(10) Patent No.: US 9,820,299 B2
(45) Date of Patent: Nov. 14, 2017

(54) METHOD FOR SENDING AND DETECTING DOWNLINK CONTROL INFORMATION, SENDING END, AND RECEIVING END

(71) Applicant: ZTE Corporation, Shenzhen, Guangdong (CN)

(72) Inventors: Bo Dai, Shenzhen (CN); Yijian Chen, Shenzhen (CN); Zhisong Zuo, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 90 days.

(21) Appl. No.: 14/653,392

(22) PCT Filed: Oct. 29, 2013

(86) PCT No.: PCT/CN2013/086173
§ 371 (c)(1),
(2) Date: Jun. 18, 2015

(87) PCT Pub. No.: WO2014/094505
PCT Pub. Date: Jun. 26, 2014

(65) Prior Publication Data
US 2016/0119946 A1    Apr. 28, 2016

(30) Foreign Application Priority Data
Dec. 18, 2012    (CN) .......................... 2012 1 0552192

(51) Int. Cl.
*H04L 12/50*    (2006.01)
*H04W 72/12*    (2009.01)
(Continued)

(52) U.S. Cl.
CPC ........... *H04W 72/1289* (2013.01); *H04L 1/00* (2013.01); *H04L 5/0053* (2013.01);
(Continued)

(58) Field of Classification Search
CPC ........................................................ H04L 1/00
(Continued)

(56) References Cited

U.S. PATENT DOCUMENTS 8,223,712 B2    7/2012  Kim
2011/0292891 A1  12/2011  Hsieh
(Continued)

FOREIGN PATENT DOCUMENTS

AU    2013362583 B2    5/2016
CN       102264135 A   11/2011
(Continued)

OTHER PUBLICATIONS

International Search Report in international application No. PCT/CN2013/086173, dated Feb. 20, 2014.
(Continued)

*Primary Examiner* — Dang Ton
(74) *Attorney, Agent, or Firm* — Oppedahl Patent Law Firm LLC

(57) ABSTRACT

A method for sending and detecting downlink control information, a sending end and a receiving end are described, the method for detecting the downlink control information may include: a User Equipment (UE)-specific search space of an enhance Physical Downlink Control Channel (ePDCCH) bearing downlink control information is determined according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate posi-
(Continued)

tions of one component carrier at the corresponding aggregation level in the corresponding resource set, and a number of configured component carriers; and the downlink control information on a physical resource corresponding to the UE-specific search space is detected. Through the disclosure, a problem of detecting the ePDCCH can be solved.

18 Claims, 2 Drawing Sheets

(51) Int. Cl.
  *H04L 1/00* (2006.01)
  *H04W 72/04* (2009.01)
  *H04L 5/00* (2006.01)
(52) U.S. Cl.
  CPC ........... *H04W 72/042* (2013.01); *H04L 5/001* (2013.01); *H04L 5/0055* (2013.01)
(58) Field of Classification Search
  USPC ........................................................ 370/329
  See application file for complete search history.

(56) References Cited

U.S. PATENT DOCUMENTS

| 2015/0295689 | A1* | 10/2015 | Lee ......................... H04L 5/001 370/329 |
| 2017/0048829 | A1* | 2/2017 | Kim .................... H04W 76/023 |

FOREIGN PATENT DOCUMENTS

| RU | 2010133624 A | 5/2012 |
| WO | 2012065727 A1 | 5/2012 |
| WO | 2012109542 A1 | 8/2012 |

OTHER PUBLICATIONS

English Translation of the Written Opinion of the International Search Authority in international application No. PCT/CN2013/086173, dated Feb. 20, 2014.
EPDCCH search space design Oct. 12, 2012.
NTT Docomo, Search Space Design for Localized EPDCCH Transmission, R1-124256, 3GPP, Sep. 29, 2012, mailed on Sep. 29, 2012.
NTT Docomo, Search Space Design for Localized EPDCCH Transmission, R1-124566, 3GPP, Oct. 12, 2012, mailed on Oct. 12, 2012.
NTT Docomo, Search Space Design for Localized EPDCCH Transmission, R1-124842, 3GPP, Nov. 3, 2012, mailed on Nov. 3, 2012.
Supplementary European Search Report in European application No. 13865797.8, dated Oct. 30, 2015.
Configuration of EPDCCH,mailed on Aug. 2012.
Details of CC-specific Offset,mailed on Aug. 2010.
Cross carrier scheduling for E-PDCCH, mailed on Nov. 2012.
PUCCH resource allocation,mailed on Sep. 2012.
Resource Allocation for PUCCH Format 3,mailed on Oct. 2010.

* cited by examiner

METHOD FOR SENDING AND DETECTING DOWNLINK CONTROL INFORMATION, SENDING END, AND RECEIVING END

TECHNICAL FIELD

The disclosure relates to a technique for detecting Downlink Control Information (DCI) in the field of communications, and in particular to a method for sending and detecting the DCI, a sending end, and a receiving end.

BACKGROUND

A Physical Downlink Control Channel (PDCCH) is defined in a Long Term Evolution (LTE) system. The PDCCH is used to bear DCI. A Control Channel Element (CCE) is taken as a unit by a physical resource transmitted by the PDCCH, a size of one CCE is 9 Resource Element Groups (REGs), namely 36 Resource Elements (REs), and one PDCCH occupies 1, 2, 4, or 8 CCEs. With regard to four kinds of PDCCHs which separately occupies 1, 2, 4, and 8 CCEs, a tree-like aggregation is adopted, namely the PDCCH occupying 1 CCE may begin from any CCE position, the PDCCH occupying 2 CCEs may begin from an even CCE position, the PDCCH occupying 4 CCEs may begin from an integral position multiplied by 4, and the PDCCH occupying 8 CCEs may begin from an integral position multiplied by 8. A Physical Uplink Control Channel (PUCCH) resource corresponding to a Physical Downlink Shared Channel (PDSCH) scheduled by the PDCCH is determined according to the CCE position corresponding to the PDCCH.

Each aggregation level L, $L \in \{1, 2, 4, 8\}$, corresponds to one search space, which includes a common search space and a User Equipment (UE)-specific search space.

In the kth sub-frame, a control field bearing the PDCCH is composed of a group of $N_{CCE,k}$ CCEs which are numbered from 0 to $N_{CCE,k}-1$. The UE shall detect a group of PDCCH candidates on each non-Discontinuous Reception (non-DRX) sub-frame to obtain control information; the detection is referred to decoding the PDCCH in the group in accordance with all DCI formats to be detected. A search space $S_k^{(L)}$ on a sub-frame k which has the aggregation level $L \in \{1, 2, 4, 8\}$ is defined by a group of PDCCH candidates, and the CCE corresponding to a PDCCH candidate m in the search space $S_k^{(L)}$ is defined by the following formula:

$$L \cdot \{(Y_k + m) \bmod \lfloor N_{CCE,k}/L \rfloor\} + i$$

wherein $i=0, \ldots, L-1$, $Y_k$ is an initiate candidate position of the UE-specific search space, $N_{CCE,k}$ is the number of the CCEs bearing the PDCCH in the kth sub-frame, $m=0, \ldots, M^{(L)}-1$, $M^{(L)}$ is the number of the PDCCH candidates to be detected in the search space $S_k^{(L)}$, and this search space is composed of continuous CCEs;

with regard to the common search space, $Y_k=0$, the value of L is 4 or 8;

with regard to the UE-specific search space, the value of L is 1, 2, 4, or 8, $Y_k=(A \cdot Y_{k-1}) \bmod D$, wherein $Y_{-1}=n_{RNTI} \neq 0$, $A=39827$, $D=65537$, $k=\lfloor n_s/2 \rfloor$, $\lfloor \ \rfloor$ represents rounding down, and $n_s$ represents a timeslot number in a radio frame, and $n_{RNTI}$ represents a corresponding Radio Network Temporary Identifier (RNTI).

A LTE-Advanced system aggregates several continuous component carriers dispersed on different frequency bands by adopting a carrier aggregation technique, forming a 100 MHz bandwidth which may be used by LTE-Advanced system, wherein one component carrier may also be taken as a serving cell. In a carrier aggregation scene, a way for cross carrier scheduling may be adopted, multiple component carriers may be scheduled on one carrier, namely the PDCCH of other component carriers may be detected on a certain component carrier. Then a Carrier Indicator Field (CIF) is needed be added in the DCI format, to determine the detected PDCCH is the PDCCH belonging to which component carrier.

When perform the cross carrier scheduling, the UE-specific search space is: $L\{(Y_k+m') \bmod \lfloor N_{CCE,k}/L \rfloor\}+i$, wherein $m'=m+M^{(L)} \cdot n_{CI}$, wherein $n_{CI}$ is a corresponding value in the CIF, and is also called an component carrier index.

In a heterogeneous network, because strong interference exists between different types of base stations, for example, interference of a Macro evolved Node-B (eNodeB) to a Pico eNodeB, and the interference of a Home eNodeB to the Macro eNodeB, a multiple antenna transmission method based on a user-specific pilot frequency in LTE R11 is used to solve the above interference problem; in addition, Frequency domain coordination of inter-cell interference may be implemented by mapping the PDCCH to a PDSCH area, and adopting a frequency division multiplexing way similar to PDSCH multiplexing. This enhanced PDCCH is called enhanced PDCCH (ePDCCH).

Currently, an ePDCCH mapping method mainly includes 2 types, namely a continuous mapping method and a discrete mapping method, a base station configures K resource block pair sets for transmitting the ePDCCH, one resource block pair set includes N resource block pairs, wherein K is 1 or 2, the value of N is 2, 4, or 8; one resource block pair includes 16 enhanced Resource Element Groups (eREGs) numbered from 0 to 15. One resource block pair may be divided into 2 enhanced Control Channel Elements (eCCEs) or 4 eCCEs; when one resource block pair is divided into 2 eCCEs, the eREG corresponding to the eCCE is {0, 2, 4, 6, 8, 10, 12, 14} or {1, 3, 5, 7, 9, 11, 13, 15}; when one resource block pair is divided into 4 eCCEs, the eREG corresponding to the eCCE is {0, 4, 8, 12}, {1, 5, 9, 13}, {2, 6, 10, 14} or {3, 7, 11, 15}. The eCCE corresponding to a continuously mapped ePDCCH (namely an L-eCCE) is composed of the eREG in one resource block pair, the eCCE corresponding to a discretely mapped ePDCCH (namely a D-eCCE) is composed of the eREG of multiple resource block pairs; an antenna port used by one resource block pair includes one or more in {107, 108, 109, 110}. As shown in FIG. 1, FIG. 1 is a structure diagram of the ePDCCH in the related art, wherein R represents a Cell-specific Reference Signal (CRS).

The UE-specific search space of the ePDCCH is composed of discrete eCCE groups, each eCCE group corresponds to continuous eCCEs, but a discrete interval thereof is not determined currently; because a structure of the ePDCCH is different from that of the PDCCH, search space generation ways of the ePDCCH and the PDCCH are also different, therefore the search space generation way when performing cross carrier scheduling is needed to be re-determined, to adapt application of the ePDCCH in a cross carrier scheduling scene. However, the above solution has not been provided in the related art, so that the detection of the ePDCCH is influenced.

In addition, a PUCCH resource corresponding to the PDSCH scheduled by the ePDCCH is determined according to an eCCE position and an Ack/Nack Resource Offset (ARO) corresponding to the ePDCCH, the value of the ARO under Time Division Duplexing (TDD) is still not determined currently.

SUMMARY

In view of this, embodiments of the disclosure provide a method for sending and detecting downlink control information, a sending end, and a receiving end, to at least solve a problem of detecting an ePDCCH.

An embodiment of the disclosure provides a method for detecting downlink control information, and this method includes:

determining a UE-specific search space of an ePDCCH bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and detecting the downlink control information on a physical resource corresponding to the UE-specific search space.

An embodiment of the disclosure further provides a method for sending downlink control information, and this method includes:

generating a UE-specific search space of an ePDCCH bearing downlink control information in accordance with a preset interval; and sending the downlink control information to a UE on a physical resource corresponding to the UE-specific search space;

wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers.

An embodiment of the disclosure further provides a receiving end, which includes:

a search space determining module, configured to determine a UE-specific search space of an ePDCCH bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and an information detecting module, configured to detect the downlink control information on a physical resource corresponding to the search space.

An embodiment of the disclosure further provides a sending end, which includes:

a search space determining module, configured to determine a UE-specific search space of an ePDCCH bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and an information sending module, configured to send the downlink control information to the UE on a physical resource corresponding to the UE-specific search space of the ePDCCH.

The method for sending and detecting the downlink control information, the sending end, and the receiving end, which are provided by the embodiment of the disclosure, solve a problem about how to determine the UE-specific search space of the ePDCCH in a cross carrier scheduling scene, facilitate detection of the ePDCCH, and can reduce overlap between candidate positions of each component carrier scheduled on the target component carrier, guarantee obtaining scheduling gain of the candidate position of scheduled each component carrier, and reduce a scheduling blocking rate of the ePDCCH.

DETAILED DESCRIPTION

A technical scheme of the disclosure is further explained in detail below in combination with the drawings and specific embodiments.

Figure 1:
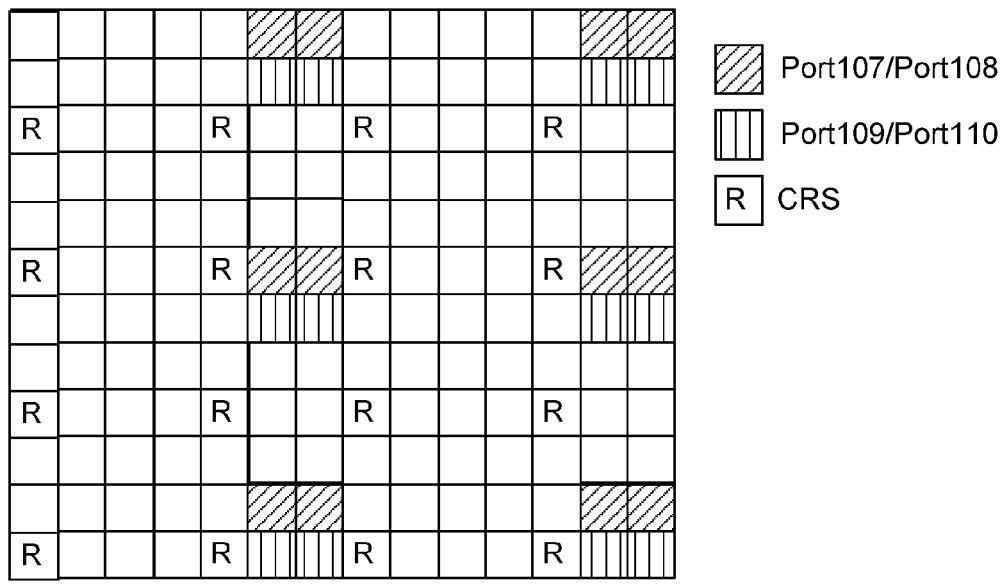
FIG. 1 is a structure diagram of an ePDCCH in the related art.
Figure 2:
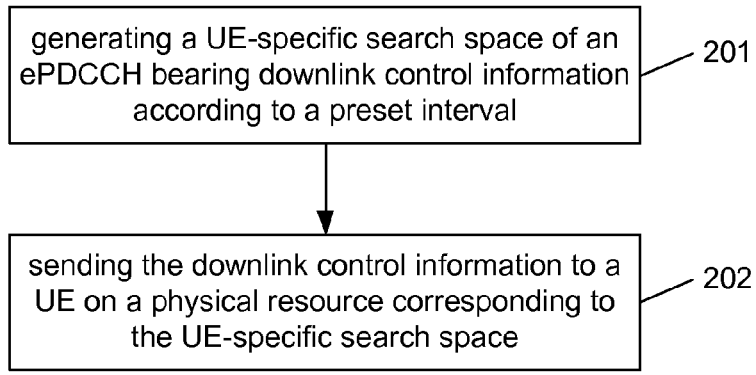
FIG. 2 is a flowchart of a method for sending downlink control information of an embodiment of the disclosure.

An embodiment of the disclosure provides a method for sending downlink control information, an execution body of the method may be a base station, as shown in FIG. 2, mainly including:

Step 201: generating a UE-specific search space of an ePDCCH bearing downlink control information according to a preset interval; and Step 202: sending the downlink control information to a UE on a physical resource corresponding to the UE-specific search space.

Wherein the preset interval is determined according to the number of candidate positions of one component carrier at a corresponding aggregation level in a corresponding resource set; or the preset interval is determined according to the number of the candidate positions of one component carrier at the corresponding aggregation level in the corresponding resource set, and the number of scheduled component carriers; or the preset interval is determined according to the number of the candidate positions of one component carrier at the corresponding aggregation level in the corresponding resource set, and the number of configured component carriers.

Preferably, when the preset interval is determined according to the number of the candidate positions of one component carrier at the corresponding aggregation level in the corresponding resource set, the preset interval is $$\left\lfloor \frac{N_{ECCE}}{L \times M_{set}^{(L)}} \right\rfloor \text{ or } \left\lfloor \frac{N_{ECCE}}{L \times (M_{set}^{(L)} + X)} \right\rfloor \text{ or } \left\lceil \frac{M_{set}^{(L)}}{2} \right\rceil \text{ or } \left\lfloor \frac{M_{set}^{(L)}}{2} \right\rfloor + 1,$$

wherein $X=(M_{set}^{(L)}+1) \bmod 2$, $N_{eCCE}$ represents the total number of the eCCEs in one resource set, L represents the aggregation level, $M_{set}^{(L)}$ represents the number of the candidate positions to be detected in a search space $S_k^{(L)}$ having an aggregation level L and corresponding to a resource set set on a sub-frame k, namely the number of the candidate positions of one component carrier at the corresponding aggregation level in the corresponding resource set.

Preferably, when the preset interval is determined according to the number of the candidate positions of one component carrier at the corresponding aggregation level in the corresponding resource set, and the number of the scheduled component carriers, or when the preset interval is determined according to the number of the candidate positions of one component carrier at the corresponding aggregation level in the corresponding resource set, and the number of the configured component carriers, the preset interval is $$\left\lfloor \frac{N_{ECCE}}{L \times M_{set}^{(L)} \times N} \right\rfloor \text{ or } \left\lfloor \frac{N_{ECCE}}{L \times (M_{set}^{(L)} + X) \times N} \right\rfloor,$$

wherein $X=(M_{set}^{(L)}+1) \bmod 2$, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, N represents the number of the scheduled component carriers or the number of configured component carriers.

Preferably, based on the above basis, the preset interval may also be determined according to a component carrier index and/or a candidate set index;

when the preset interval is further determined according to the candidate set index, the preset interval is $$\left\lfloor \frac{m \times N_{ECCE}}{L \times M_{set}^{(L)}} \right\rfloor \text{ or } \left\lfloor \frac{m \times N_{ECCE}}{L \times (M_{set}^{(L)} + X)} \right\rfloor \text{ or } \left\lfloor \frac{m \times N_{ECCE}}{L \times M_{set}^{(L)} \times N} \right\rfloor \text{ or }$$

$$\left\lfloor \frac{m \times N_{ECCE}}{L \times (M_{set}^{(L)} + X) \times N} \right\rfloor,$$

wherein $X=(M_{set}^{(L)}+1) \bmod 2$, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, m represents the candidate set index, and N represents the number of the scheduled component carriers or the number of the configured component carriers;

when the preset interval is further determined according to the component carrier index, the preset interval is $$\left\lfloor \frac{N_{ECCE} \times n_{CI}}{L \times M_{set}^{(L)} \times N} \right\rfloor \text{ or } \left\lfloor \frac{N_{ECCE} \times n_{CI}}{L \times (M_{set}^{(L)} + X) \times N} \right\rfloor,$$

$X=(M_{set}^{(L)}+1) \bmod 2$, wherein $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, $n_{CI}$ represents the component carrier index, and N represents the number of the scheduled component carriers or the number of the configured component carriers;

when the preset interval is further determined according to the component carrier index and the candidate set index, the preset interval is $$\left\lfloor \frac{(n_{CI} + m \times N_{CC}^{Num}) \times N_{ECCE}}{L \times (M_{set}^{(L)} + X)} \right\rfloor \text{ or }$$

$$\left\lfloor \frac{(n_{CI} + m \times N_{CC}^{Num}) \times N_{ECCE}}{L \times M_{set}^{(L)} \times N} \right\rfloor \text{ or }$$

$$\left\lfloor \frac{(n_{CI} \times M_{set}^{(L)} + m) \times N_{ECCE}}{L \times (M_{set}^{(L)} + X)} \right\rfloor \text{ or }$$

$$\left\lfloor \frac{(m + M_{set}^{(L)} \times n_{CI}) \times N_{ECCE}}{L \times M_{set}^{(L)} \times N} \right\rfloor,$$

wherein $X=(M_{set}^{(L)}+1) \bmod 2$, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, m represents the candidate set index, $n_{CI}$ represents the component carrier index, and $N_{CC}^{Num}$ represents the number of the component carriers scheduled on the target component carrier or represents the number of the configured component carriers.

Preferably, the preset interval meets at least one of the following conditions:

A: the preset interval of a target component carrier in a cross carrier scheduling scene is the same as that of the target component carrier in a non-cross carrier scheduling scene;

B: the preset interval of the target component carrier in the cross carrier scheduling scene is the same as that of the component carrier scheduled by the target component carrier in the cross carrier scheduling scene; and C: the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

Preferably, candidate sets of each component carrier scheduled by the target component carrier adopt the same candidate set index;

or, the candidate sets of each component carrier scheduled by the target component carrier are cross-mapped in accordance with the component carrier index;

or, the candidate sets of each component carrier scheduled by the target component carrier are sequentially mapped in accordance with the component carrier index.

Based on the above preset interval and condition, preferably, when performing the cross carrier scheduling, one way for generating the UE-specific search space is:

$$L\left\{\left(Y_k + n_{CI} + \left\lfloor \frac{m \times N_{ECCE}}{L \times M_{set}^{(L)}} \right\rfloor\right) \bmod \lfloor N_{eCCE}/L \rfloor\right\} + i$$

wherein $Y_k$ represents an initial candidate position of the UE-specific search space, $n_{CI}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, i=0, . . . , L−1, m represents the candidate set index, and m=0, . . . , $M_{set}^{(L)}$−1;

this way may achieve an effect that the candidate sets of each component carrier scheduled by the target component carrier adopt the same candidate set index; this way may also achieve the effect that the preset interval of the target component carrier in the cross carrier scheduling scene is the same as that of the target component carrier in the non-cross carrier scheduling scene; this way may also achieve the effect that the preset interval of the target component carrier in the cross carrier scheduling scene is the same as that of the component carrier scheduled by the target component carrier in the cross carrier scheduling scene.

Preferably, when performing the cross carrier scheduling, another way for generating the UE-specific search space is:

$$L\left\{\left(Y_k + \left\lfloor \frac{(n_{CI} \times M_{set}^{(L)} + m) \times N_{ECCE}}{L \times M_{set}^{(L)} + N_{CC}^{Num}} \right\rfloor\right) \bmod \lfloor N_{eCCE}/L \rfloor\right\} + i$$

wherein $Y_k$ represents the initial candidate position of the UE-specific search space, $n_{CI}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, $N_{CC}^{Num}$ represents the number of the component carriers scheduled on the target component carrier or represents the number of the configured component carriers, i=0, . . . , L−1, m represents the candidate set index, and m=0, . . . , $M_{set}^{(L)}$−1;

this way may achieve the effect that the candidate sets of each component carrier scheduled by the target component carrier are sequentially mapped in accordance with the component carrier index; this way may also achieve the effect that the preset interval of the component carrier scheduled by the target component carrier in the cross carrier scheduling scene is determined according to the number of the candidate positions of N component carriers at the corresponding aggregation level in the corresponding resource set.

Preferably, when performing the cross carrier scheduling, another way for generating the UE-specific search space is:

$$L\left\{\left(Y_k + \left\lfloor \frac{(n_{CI} + m \times N_{CC}^{Num}) \times N_{ECCE}}{L \times M_{set}^{(L)} \times N_{CC}^{Num}} \right\rfloor\right) \bmod \lfloor N_{eCCE}/L \rfloor\right\} + i$$

wherein $Y_k$ represents the initial candidate position of the UE-specific search space, $n_{CI}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, $N_{CC}^{Num}$ represents the number of the component carriers on scheduled the target component carrier or represents the number of the configured component carriers, i=0, . . . , L−1, m represents the candidate set index, and m=0, . . . , $M_{set}^{(L)}$−1;

this way may achieve the effect that the candidate set of each component carrier scheduled by the target component carrier is cross-mapped in accordance with the component carrier index.

Preferably, when performing the cross carrier scheduling, another way for generating the UE-specific search space is:

$$\left\{\left(Y_k + \left\lfloor \frac{(n_{CI} \times M_{set}^{(L)} + m + G) \times N_{ECCE}}{L \times Z \times N_{CC}^{Num}} \right\rfloor\right) \bmod \lfloor N_{eCCE}/L \rfloor\right\} + i$$

wherein $Y_k$ represents the initial candidate position of the UE-specific search space, $n_{CI}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, $N_{CC}^{Num}$ represents the number of the component carriers scheduled on the target component carrier or represents the number of the configured component carriers, i=0, . . . , L−1, X=($M_{set}^{(L)}$+1)mod 2, Z=$M_{set}^{(L)}$+X, G is 0 or X, m represents the candidate set index, and m=0, . . . , $M_{set}^{(L)}$−1;

this way may achieve the effect that the candidate sets of each component carrier scheduled by the target component carrier are sequentially mapped in accordance with the component carrier index; this way may also achieve the effect that the preset interval of the component carrier scheduled by the target component carrier in the cross carrier scheduling scene is determined according to the number of the candidate positions of N component carriers at the corresponding aggregation level in the corresponding resource set.

Preferably, when performing the cross carrier scheduling, another way for generating the UE-specific search space is:

$$\left\{ \left( Y_k + n_{CI} + \left\lfloor \frac{(m+G) \times N_{ECCE}}{L \times Z} \right\rfloor \right) \bmod \lfloor N_{eCCE}/L \rfloor \right\} + i,$$

$X = (M_{set}^{(L)}+1) \bmod 2$, $Z = M_{set}^{(L)} + X$, G is 0 or X;

wherein $Y_k$ represents the initial candidate position of the UE-specific search space, $n_{CI}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, i=0, . . . , L−1, m represents the candidate set index, and m=0, . . . , $M_{set}^{(L)}$−1.

This way may achieve the effect that the candidate sets of each component carrier scheduled by the target component carrier adopt the same candidate set index; this way may also achieve the effect that the preset interval of the target component carrier in the cross carrier scheduling scene is the same as that of the target component carrier in the non-cross carrier scheduling scene; this way may also achieve the effect that the preset interval of the target component carrier in the cross carrier scheduling scene is the same as that of the component carrier scheduled by the target component carrier in the cross carrier scheduling scene.

Preferably, when performing the cross carrier scheduling, another way for generating the UE-specific search space is:

$$\{N_{eCCE}^{RB} \times (\lfloor A/N_{eCCE}^{RB} \rfloor + n_{CI}) + L \times (Y_k + m + n_{CI}) \bmod \lfloor N_{eCCE}^{RB}/L \rfloor\} + i$$

$$A = L \left\{ \left( Y_k + \left\lfloor \frac{m \times N_{ECCE}}{L \times M_{set}^{(L)}} \right\rfloor \right) \bmod \lfloor N_{eCCE}/L \rfloor \right\}$$

wherein $Y_k$ represents the initial candidate position of the UE-specific search space, $n_{CI}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, $N_{CC}^{Num}$ represents the number of the component carriers scheduled on the target component carrier or represents the number of the configured component carriers, i=0, . . . , L−1, m represents the candidate set index, and m=0, . . . , $M_{set}^{(L)}$−1.

This way may achieve the effect that the preset interval of the component carrier scheduled by the target component carrier in the cross carrier scheduling scene is determined according to the number of the candidate positions of one component carrier at the corresponding aggregation level in the corresponding resource set, and the candidate positions of each component carrier scheduled by the target component carrier are in adjacent resource blocks.

Preferably, when performing the cross carrier scheduling, another way for generating the UE-specific search space is: the way for generating the UE-specific search space when performing the cross carrier scheduling is the same as that of generating the UE-specific search space when performing the non-cross carrier scheduling, and the resource sets corresponding the UE-specific search space of all component carriers scheduled by the target component carrier are configured by different signallings.

Based on the above preset interval and conditions, preferably, one way for generating the UE-specific search space when performing the non-cross carrier scheduling:

$$L\left\{ \left( Y_k + \left\lfloor \frac{m \times N_{ECCE}}{L \times M_{set}^{(L)}} \right\rfloor \right) \bmod \lfloor N_{eCCE}/L \rfloor \right\} + i$$

wherein $Y_k$ represents the initial candidate position of the UE-specific search space, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, i=0, . . . , L−1, m represents the candidate set index, and m=0, . . . , $M_{set}^{(L)}$−1.

Preferably, when performing the non-cross carrier scheduling, another way for generating the UE-specific search space is:

$$\left\{ \left( Y_k + \left\lfloor \frac{(m+X) \times N_{ECCE}}{L \times Z} \right\rfloor \right) \bmod \lfloor N_{eCCE}/L \rfloor \right\} + i$$

wherein $Y_k$ represents the initial candidate position of the UE-specific search space, $N_{eCCE}$ represents the total number of the eCCEs in one resource set, L represents the aggregation level, i=0, . . . , L−1, m represents the candidate set index, m=0, . . . , $M_{set}^{(L)}$−1, $X = (M_{set}^{(L)}+1) \bmod 2$, $Z = M_{set}^{(L)} + X$, $M_{set}^{(L)}$ represents the number of the candidate positions to be detected in the search space V) having the aggregation level L and corresponding to the resource set set on the sub-frame k, namely the number of the candidate positions of one component carrier at the corresponding aggregation level in the corresponding resource set.

Preferably, when performing the non-cross carrier scheduling, another way for generating the UE-specific search space is:

$$\{N_{eCCE}^{RB} \times \lfloor A/N_{eCCE}^{RB} \rfloor + L \times (Y_k + m) \bmod \lfloor N_{eCCE}^{RB}/L \rfloor\} + i$$

$$A = L \left\{ \left( Y_k + \left\lfloor \frac{m \times N_{ECCE}}{L \times M_{set}^{(L)}} \right\rfloor \right) \bmod \lfloor N_{eCCE}/L \rfloor \right\}$$

wherein $Y_k$ represents the initial candidate position of the UE-specific search space, $N_{eCCE}$ represents the total number of the eCCEs in one resource set, L represents the aggregation level, i=0, . . . , L−1, m represents the candidate set index, m=0, . . . , $M_{set}^{(L)}-1$, $M_{set}^{(L)}$ represents the number of the candidate positions to be detected in the search space $S_k^{(L)}$ having the aggregation level L and corresponding to the resource set on the sub-frame k, namely the number of the candidate positions of one component carrier at the corresponding aggregation level in the corresponding resource set, and $N_{eCCE}^{RB}$ the number of the eCCEs contained in one resource block.

When performing the above non-cross carrier scheduling, the way for generating the UE-specific search space may achieve the effect that the preset interval of the target component carrier in the non-cross carrier scheduling scene is determined according to the number of the candidate positions of one component carrier at the corresponding aggregation level in the corresponding resource set.

Preferably, an initial position of the UE-specific search space corresponding the same resource set index of the component carrier adopts the same configuration, Embodiment 1 thereof is: the initial position of the UE-specific search space corresponding to each component carrier adopts the following configuration:

the initial position on the sub-frame k is: $Y_k=(A \cdot Y_{k-1}) \bmod D$, wherein $Y_{-1}=n_{RNTI} \neq 0$, A=39827, 39829, 39825, 39823, 39821, 39831 or 39837, D=65537, $k=\lfloor n_s/2 \rfloor$, $\lfloor \ \rfloor$ represents rounding down, $n_s$ represents a timeslot number in one radio frame, and $n_{RNTI}$ represents a corresponding Radio Network Temporary Identifier (RNTI);

wherein different resource sets correspond to different values of A, for example, a resource set 0 corresponds to A=39827 and a resource set 1 corresponds to A=39829, or the resource set 0 corresponds to A=39827 and the resource set 1 corresponds to A=39823;

Embodiment 2 is: the initial position of the UE-specific search space corresponding to each component carrier adopts the following configuration:

the initial position on the sub-frame k is: $Y_k=(A \cdot Y_{k-1}) \bmod D$, wherein $Y_{-1}=n_{RNTI}+s \times 2^{16} \neq 0$, A=39827, D=65537, $k=\lfloor n_s/2 \rfloor$, $\lfloor \ \rfloor$ represents rounding down, $n_s$ represents the timeslot number in one radio frame, $n_{RNTI}$ represents the corresponding RNTI, and s represents the resource set index;

Embodiment 3 is: the initial position of the UE-specific search space corresponding to each component carrier adopts the following configuration:

the initial position of a resource set s on the sub-frame k is: $Y_K^s=Y_{K+S}$ or $Y_K^s=Y_{K \times 2+S}$ or $Y_K^s=Y_K+B$, B is 1 or $M_{set}^{(L)}$, $Y_k=(A \cdot Y_{k-1}) \bmod D$, wherein $Y_{-1}=n_{RNTI} \neq 0$, A=39827, D=65537, $k=\lfloor n_s/2 \rfloor$, $\lfloor \ \rfloor$ represents rounding down, $n_s$ represents the timeslot number in one radio frame, and $n_{RNTI}$ represents the corresponding RNTI.

Preferably, the initial positions of the UE-specific search space corresponding to the same resource set index of the component carrier adopt separate configurations, Embodiment 1 thereof is:

the initial position on the sub-frame k is: $Y_k=(A \cdot Y_{k-1}) \bmod D$, wherein $Y_{-1}=n_{RNTI} \neq 0$, A=39827, 39829, 39825, 39823, 39821, 39831 or 39837, D=65537, $k=\lfloor n_s/2 \rfloor$, $\lfloor \ \rfloor$ represents rounding down, $n_s$ represents the timeslot number in one radio frame, $n_{RNTI}$ represents the corresponding RNTI; different component carriers correspond to different values of A;

Embodiment 2 is:

the initial position on the sub-frame k is: $Y_k=(A \cdot Y_{k-1}) \bmod D$, wherein $Y_{-1}=n_{RNTI}+n_{CI} \times 2^{17}+s \times 2^{16} \neq 0$, A=39827, 39829, 39825, 39823, 39821, 39831 or 39837, D=65537, $k=\lfloor n_s/2 \rfloor$, $\lfloor \ \rfloor$ represents rounding down, $n_s$ represents the timeslot number in one radio frame, $n_{RNTI}$ represents the corresponding RNTI, $n_{CI}$ represents the component carrier index, and s represents the resource set index;

Embodiment 3 is:

the initial position on the sub-frame k is: $Y'_k=Y_k+n_{CI}$, $Y_k=(A \cdot Y_{k-1}) \bmod D$, wherein $Y_{-1}=n_{RNTI} \neq 0$, A=39827, 39829, 39825, 39823, 39821, 39831 or 39837, D=65537, $k=\lfloor n_s/2 \rfloor$, $\lfloor \ \rfloor$ represents rounding down, $n_s$ the timeslot number in one radio frame, and $n_{RNTI}$ represents the corresponding RNTI.

Several preferred embodiments of the disclosure are also provided below for further explanation.

In Embodiment 1 of the disclosure, when performing the non-cross carrier scheduling, the UE-specific search space is determined as:

$$L\left\{\left(Y_k + \left\lfloor \frac{m \times N_{ECCE}}{L \times M_{set}^{(L)}} \right\rfloor \right) \bmod \lfloor N_{eCCE}/L \rfloor \right\} + i,$$

when performing the cross carrier scheduling, the UE-specific search space is determined as:

$$L\left\{\left(Y_k + n_{CI} + \left\lfloor \frac{m \times N_{ECCE}}{L \times M_{set}^{(L)}} \right\rfloor \right) \bmod \lfloor N_{eCCE}/L \rfloor \right\} + i,$$

the initial position on the sub-frame k is: $Y_k=(A \cdot Y_{k-1}) \bmod D$, wherein $Y_k$ represents the initial candidate position of the UE-specific search space, $N_{eCCE}$ represents the total number of the eCCEs in one resource set, L represents the aggregation level, $M_{set}^{(L)}$ represents the number of the candidate positions of one component carrier at the corresponding aggregation level in the corresponding resource set, i=0, . . . , L−1, m represents the candidate set index, $n_{CI}$ represents the component carrier index; $Y_{-1}=n_{RNTI} \neq 0$, A=39827, 39829, 39825, 39823, 39821, 39831 or 39837, D=65537, $k=\lfloor n_s/2 \rfloor$, $\lfloor \ \rfloor$ represents rounding down, $n_s$ the timeslot number in one radio frame, $n_{RNTI}$ represents the corresponding RNTI, different resource sets correspond to different values of A; the aggregation level may be 1, 2, 4, 8, 16, 32, the number of the candidate positions may be 1, 2, 3, 4, 5, 6, 7, 8, 9, 10, and the total number of the eCCEs in one resource set may be 4, 8, 16, 32, 64.

In Embodiment 2 of the disclosure, when performing the non-cross carrier scheduling, the UE-specific search space is determined as:

$$\left\{\left(Y_k + \left\lfloor \frac{(m+X) \times N_{ECCE}}{L \times Z} \right\rfloor \right) \bmod \lfloor N_{eCCE}/L \rfloor \right\} + i,$$

$X=(M_{set}^{(L)}+1) \bmod 2$, $Z=M_{set}^{(L)}+X$, when performing the cross carrier scheduling, the UE-specific search space is determined as:

$$\left\{\left(Y_k + \left\lfloor \frac{(n_{CI} \times M_{set}^{(L)} + m + G) \times N_{ECCE}}{L \times Z \times N_{CC}^{Num}} \right\rfloor \right) \bmod \lfloor N_{eCCE}/L \rfloor \right\} + i,$$

$X=(M_{set}^{(L)}+1) \mod 2$, $Z=M_{set}^{(L)}+X$, G is 0 or X, the initial position of the resource set S on the sub-frame k: $Y_K^S=Y_{K+S}$ or $Y_K^s=Y_{K\times 2+S}$ or $Y_K^s=Y_K+B$, B is 1 or $M_{set}^{(L)}$, and $Y_k=(A\cdot Y_{k-1}) \mod D$;

wherein $Y_k$ represents the initial candidate position of the UE-specific search space, $n_{CI}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, $N_{CC}^{Num}$ represents the number of the component carriers scheduled on the target component carrier or represents the number of the configured component carriers, i=0, . . . , L−1, m represents the candidate set index, m=0, . . . , $M_{set}^{(L)}$−1; $Y_{-1}=n_{RNTI}\neq 0$, A=39827, D=65537, $k=\lfloor n_s/2 \rfloor$, $\lfloor\;\rfloor$ represents rounding down, $n_s$ the timeslot number in one radio frame, $n_{RNTI}$ represents the corresponding RNTI; the aggregation level may be 1, 2, 4, 8, 16, 32, the number of the candidate positions may be 1, 2, 3, 4, 5, 6, 7, 8, 9, 10, the total number of the eCCEs in one resource set may be 4, 8, 16, 32, 64.

In embodiment 3 of the disclosure, when performing the non-cross carrier scheduling, the UE-specific search space is determined as:

$$\{N_{eCCE}^{RB} \times \lfloor A/N_{eCCE}^{RB} \rfloor + L \times (Y_k + m) \mod \lfloor N_{eCCE}^{RB}/L \rfloor\} + i,$$

$$A = L\left\{\left(Y_k + \left\lfloor \frac{m \times N_{ECCE}}{L \times M_{set}^{(L)}} \right\rfloor\right) \mod \lfloor N_{eCCE}/L \rfloor\right\},$$

when performing the cross carrier scheduling, the UE-specific search space is determined as:

$$\{N_{eCCE}^{RB} \times (\lfloor A/N_{eCCE}^{RB} \rfloor + n_{CI}) + L \times (Y_k + m + n_{CI}) \mod \lfloor N_{eCCE}^{RB}/L \rfloor\} + i,$$

$$A = L\left\{\left(Y_k + \left\lfloor \frac{m \times N_{ECCE}}{L \times M_{set}^{(L)}} \right\rfloor\right) \mod \lfloor N_{eCCE}/L \rfloor\right\},$$

the initial position of the resource set s on the sub-frame k is: $Y_k=(A\cdot Y_{k-1}) \mod D$, wherein $Y_{-1}=n_{RNTI}+n_{CI}\times 2^{17}+s\times 2^{16}\neq 0$, A=39827, 39829, 39825, 39823, 39821, 39831 or 39837, D=65537, $k=\lfloor n_s/2 \rfloor$, $\lfloor\;\rfloor$ represents rounding down, $n_s$ the timeslot number in one radio frame, $n_{RNTI}$ represents the corresponding RNTI, $n_{CI}$ represents the component carrier index, s represents the resource set index; $Y_k$ represents the initial candidate position of the UE-specific search space, $n_{CL}$ represents the component carrier index, $N_{eCCE}$ represents the total number of the eCCEs in one resource set, L represents the aggregation level, $M_{set}^{(L)}$ represents the number of the candidate positions to be detected in the search space $S_k^{(L)}$ having the aggregation level L and corresponding to the resource set set on the sub-frame k, namely the number of the candidate positions of one component carrier at the corresponding aggregation level in the corresponding resource set, $N_{CC}^{Num}$ represents the number of the component carriers scheduled on the target component carrier or represents the number of the configured component carriers, i=0, . . . , L−1, m represents the candidate set index, m=0, . . . , $M_{set}^{(L)}$−1; the aggregation level may be 1, 2, 4, 8, 16, 32, the number of the candidate positions may be 1, 2, 3, 4, 5, 6, 7, 8, 9, 10, the total number of the eCCEs in one resource set may be 4, 8, 16, 32, 64.

In Embodiment 4 of the disclosure, in a TDD system, a relating ARO scope when determining a PUCCH resource corresponding to the PDSCH scheduled by the ePDCCH transmitted by the candidate position according to the preset information, and the preset information includes at least one of the followings: a sub-frame index, and the number H of downlink sub-frames corresponding to an uplink sub-frame in which the PUCCH is located;

Embodiment 1 the preset information includes the sub-frame index, specifically:

the ARO scope is determined according to a position h of a downlink sub-frame index k in which the ePDCCH is located in a downlink sub-frame window corresponding to the uplink sub-frame in which the PUCCH is located; h is numbered from 0;

the ARO scope corresponds to n sets, n is 4, a specific determination way is:

h is 0, then an ARO is {2, −1, 0, −2},
h is 1, then the ARO is {2, 0, −1, $-N_{eCCE(k-1,j)}$} or {2, 0, −2, $-N_{eCCE(k-1,j)}$},
h is 2, then the ARO is {2, 0, $-N_{eCCE(k-2,j)}-N_{eCCE(k-1,j)}$, $-N_{eCCE(k-1,j)}$},
h is 3, then the ARO is {2, 0, $-N_{eCCE(k-3,j)}-N_{eCCE(k-2,j)}-N_{eCCE(k-1,j)}$, $-N_{eCCE(k-2,j)}-N_{eCCE(k-1,j)}$};

or, the ARO scope corresponds to n sets, n is 3, the specific determination way is:

the ARO scope corresponding to a first sub-frame in H sub-frames is: {−2, 2, −1, 0},
the ARO scope corresponding to a last sub-frame in H sub-frames is: {2, 0, $-N_{eCCE(k-1,j)}$, $-N_{eCCE(k-2,j)}-N_{eCCE(k-1,j)}$},
the ARO scope corresponding to other sub-frames in H sub-frames is: {2, 0, $-N_{eCCE(k-1,j)}$, $N_{eCCE(k,j)}$};

or, the ARO scope corresponds to n sets, n is 3, the specific determination way is:

the ARO scope corresponding to the first sub-frame in H sub-frames is: {−2, 2, −1, 0},
the ARO scope corresponding to other sub-frames in H sub-frames is: {2, 0, $-N_{eCCE(k-1,j)}$, $-N_{eCCE(k,j)}$};
the ARO scope corresponding to other sub-frames in H sub-frame is: {2, 0, $-N_{eCCE(k-1),j}$, $-N_{eCCE(k-2,j)}-N_{eCCE(k-1,j)}$};

or, the ARO scope corresponds to n sets, n is 2, the specific determination way is:

the ARO scope corresponding to the first sub-frame in H sub-frames is: {−2, 2, −1, 0};
the ARO scope corresponding to other sub-frames in H sub-frames is: {2, 0, $-N_{eCCE(k-1,j)}$, $N_{eCCE(k,j)}$};

or, the ARO scope corresponds to n sets, n is 2, the specific determination way is:

the ARO scope corresponding to the first sub-frame in H sub-frames is: {−2, 2, −1, 0},
the ARO scope corresponding to other sub-frames in H sub-frames is: {2, 0, $-N_{eCCE(k-1,j)}$, $-N_{eCCE(k-1,j)}-N_{eCCE(k,j)}$};

Embodiment 2 the preset information includes the sub-frame index and the number H of the downlink sub-frames corresponding to the uplink sub-frame in which the PUCCH is located;

the ARO scope is determined according to the position h of the downlink sub-frame index k in which the ePDCCH is located in the downlink sub-frame window corresponding to the uplink sub-frame in which the PUCCH is located; h is numbered from 0;

when H is 1, the ARO scope is {−2, 2, −1, 0}, when H is 2, h is 1, then the ARO scope is {−2, 2, −1, 0}, h is 2, then the ARO scope is {2, 0, −1, −$N_{eCCE(k-1,j)}$} or {2, 0, −2, −$N_{eCCE(k-1,j)}$}, when H is 3, h is 1, then the ARO scope is {−2, 2, −1, 0}, h is 2, then the ARO scope is {2, 0, −$N_{eCCE(k-1,j)}$, $N_{eCCE(k,j)}$} or {2, 0, −2, −$N_{eCCE(k-1,j)}$} or {2, 0, −1, −$N_{eCCE(k-1,j)}$}, h is 3, then the ARO scope is {2, 0, −$N_{eCCE(k-2,j)}$−$N_{eCCE(k-1,j)}$, −$N_{eCCE(k-1,j)}$};

when H is 4, h is 1, then the ARO scope is {−2, 2, −1, 0}, h is 2, then the ARO scope is {2, 0, −$N_{eCCE(k-1,j)}$, $N_{eCCE(k,j)}$} or {2, 0, −2, −$N_{eCCE(k-1,j)}$} or {2, 0, −1, −$N_{eCCE(k-1,j)}$}, h is 3, then the ARO scope is {2, 0, −$N_{eCCE(k-2,j)}$−$N_{eCCE(k-1,j)}$, −$N_{eCCE(k-1,j)}$} h is 4, then the ARO scope is {2, 0, −$N_{eCCE(k-3,j)}$−$N_{eCCE(k-2,j)}$−$N_{eCCE(k-1,j)}$, −$N_{eCCE(k-2,j)}$−$N_{eCCE(k-1,j)}$} or {2, 0, −$N_{eCCE(k-3,j)}$−$N_{eCCE(k-2,j)}$−$N_{eCCE(k-1,j)}$, −$N_{eCCE(k-1,j)}$};

Embodiment 3 the preset information includes the number H of the downlink sub-frames corresponding to the uplink sub-frame in which the PUCCH is located, specifically:

when H is 1, the ARO scope is {2, 2, −1, 0}, when H is other values, the ARO scope is {2, 0, $N_{eCCE(j)}$*⌈(D)/2⌉, $N_{eCCE(j)}$*D}, wherein D is H or H−1.

Embodiment 4 the preset information includes the sub-frame index and the number H of the downlink sub-frames corresponding to the uplink sub-frame in which the PUCCH is located;

the preset information includes the sub-frame index, specifically:

the ARO scope is determined according to the position h of the downlink sub-frame index k in which the ePDCCH is located in the downlink sub-frame window corresponding to the uplink sub-frame in which the PUCCH is located; h is numbered from 0; the specific determination way is:

the ARO scope is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or a first preset value, D2 is $$\sum_{k=h-T_6}^{h-1} N_{eCCE(k,j)}$$

or a second preset value, T5 and T6 are integers;

preferably, the corresponding values of T1 and T2 are T1=−⅓, T2=−1, or T1=−½, T2=−1, or T1=−⅔, T2=−1, or T1=−⅓, T2=−⅔, or T1=−⅓, T2=−½, or T1=−½, T2=−⅔, or T1=−½, T2=−¾, or T1=−⅓, T2=−¾, or T1=−1, T2=−1, or T1=−1, T2=−2; the corresponding values of T3 and T4 are T3=0, T4=0, or T3=−1, T4=−2, or T3=−2, T4=−1; the corresponding values of T5 and T6 are T5=h, T6=h, or T5=h−1, T6=h, or T5=1, T6=2, or T5=0, T6=1, or T5=1, T6=1;

the first preset value is the number of the eCCEs corresponding to w1 resource sets, the second preset value is the number of the eCCEs corresponding to w2 resource sets; the values of w1 and w2 may be the same, or may be not the same, for example a specific value is: 0, 1, 2, 3, 4, 9; wherein the number of the eCCEs corresponding to the resource set is a maximum number or a minimum number of the eCCEs corresponding to a resource set j in the downlink sub-frame corresponding to the uplink sub-frame in which the PUCCH is located under a current configuration, or is the number of the eCCEs corresponding to the first downlink sub-frame resource set j, and the resource set j is the resource set in which the ePDCCH corresponding to the PUCCH is located.

or, the first preset value and the second preset value may also separately be one constant value, such as 0, 4, 8, 16, 32, and etc.;

H is a positive integer, and a preferred value range is 1, 2, 3, 4, 9;

it shall be explained that a rounding down operation ⌊ ⌋ when determining the value of the AOR in Embodiment 4 may also be substituted with a rounding up operation ⌈ ⌉.

The above formula is specifically exampled below:

the ARO is $$\left\{0, 2, -\left\lfloor \sum_{k=0}^{h-1} N_{eCCE(k,j)}/2 \right\rfloor, -\sum_{k=0}^{h-1} N_{eCCE(k,j)} \right\},$$

or the ARO is $$\left\{0, 2, -\left\lfloor \sum_{k=0}^{h-1} N_{eCCE(k,j)} \times 2/3 \right\rfloor, -\left\lfloor \sum_{k=0}^{h-1} N_{eCCE(k,j)}/3 \right\rfloor \right\},$$

or the ARO is $$\left\{0, 2, -\left\lfloor \sum_{k=0}^{h-1} N_{eCCE(k,j)} \times 2/3 \right\rfloor, -\left\lfloor \sum_{k=0}^{h-1} N_{eCCE(k,j)}/2 \right\rfloor \right\},$$

or the ARO is $$\left\{0, 2, -\left\lfloor \sum_{k=0}^{h-1} N_{eCCE(k,j)}/2 \right\rfloor - 1, -\sum_{k=0}^{h-1} N_{eCCE(k,j)} - 2 \right\},$$

or the ARO is $$\left\{0, 2, -\left\lfloor \sum_{k=0}^{h-1} N_{eCCE(k,j)}/3 \right\rfloor - 1, -\left\lfloor \sum_{k=0}^{h-1} N_{eCCE(k,j)} \times 2/3 \right\rfloor - 2 \right\},$$

or the ARO is $$\left\{0, 2, -\left\lfloor \sum_{k=0}^{h-1} N_{eCCE(k,j)}/2 \right\rfloor - 1, \left\lfloor \sum_{k=0}^{h-1} N_{eCCE(k,j)} \times 2/3 \right\rfloor - 2\right\};$$

or, h is 0, then the ARO is {2, −1, 0, −2}, when h is other values, the ARO is $$\left\{0, 2, -\left\lfloor \sum_{k=0}^{h-1} N_{eCCE(k,j)} \times \frac{1}{2} \right\rfloor, -\sum_{k=0}^{h-1} N_{eCCE(k,j)}\right\},$$

or ARO is $$\left\{0, 2, -\left\lfloor \sum_{k=0}^{h-1} N_{eCCE(k,j)} \times \frac{1}{3} \right\rfloor, -\left\lfloor \sum_{k=0}^{h-1} N_{eCCE(k,j)} \times \frac{2}{3} \right\rfloor\right\},$$

or the ARO is $$\left\{0, 2, -\left\lfloor \sum_{k=0}^{h-1} N_{eCCE(k,j)} \times \frac{1}{2} \right\rfloor, -\left\lfloor \sum_{k=0}^{h-1} N_{eCCE(k,j)} \times \frac{2}{3} \right\rfloor\right\},$$

or the ARO is $$\left\{0, 2, -\left\lfloor \sum_{k=0}^{h-1} N_{eCCE(k,j)} \times \frac{1}{2} \right\rfloor, -\sum_{k=0}^{h-1} N_{eCCE(k,j)} - 2\right\},$$

or the ARO is $$\left\{0, 2, -\left\lfloor \sum_{k=0}^{h-1} N_{eCCE(k,j)} \times \frac{1}{3} \right\rfloor - 1, -\left\lfloor \sum_{k=0}^{h-1} N_{eCCE(k,j)} \times \frac{2}{3} \right\rfloor - 2\right\},$$

or the ARO is $$\left\{0, 2, -\left\lfloor \sum_{k=0}^{h-1} N_{eCCE(k,j)} \times \frac{1}{2} \right\rfloor - 1, -\left\lfloor \sum_{k=0}^{h-1} N_{eCCE(k,j)} \times \frac{3}{4} \right\rfloor - 2\right\}.$$

In the above Embodiment 4 of the disclosure, k represents the sub-frame index, j identifies the resource set index, $N_{eCCE(k,j)}$ represents the number of the eCCEs corresponding to the resource set j of the sub-frame k.

Figure 3:
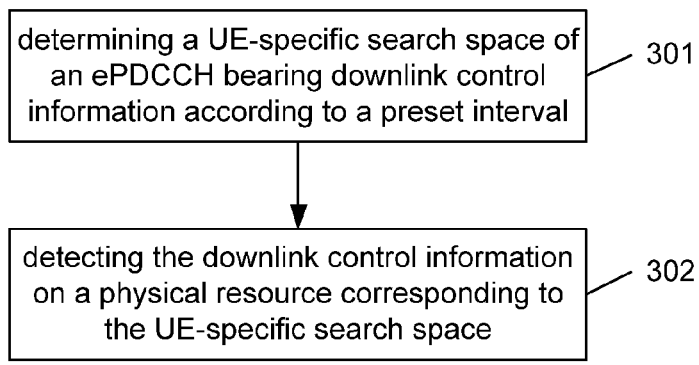
FIG. 3 is a flowchart of a method for detecting downlink control information of an embodiment of the disclosure.

An embodiment of the disclosure further provides a method for detecting downlink control information, an execution body thereof may be a UE, as shown in FIG. 3, mainly including:

Step 301: determining a UE-specific search space of an ePDCCH bearing downlink control information according to a preset interval; wherein the preset interval is determined according to the number of candidate positions of one component carrier at a corresponding aggregation level in a corresponding resource set, or the preset interval is determined according to the number of the candidate positions of one component carrier at the corresponding aggregation level in the corresponding resource set, and the number of scheduled component carriers, or the preset interval is determined according to the number of the candidate positions of one component carrier at the corresponding aggregation level in the corresponding resource set, and the number of configured component carriers;

Step 302: detecting the downlink control information on a physical resource corresponding to the UE-specific search space.

Preferably, the preset interval may also be determined according to a component carrier index and/or a candidate set index.

Preferably, the preset interval meets at least one of the following conditions:

the preset interval of a target component carrier in a cross carrier scheduling scene is the same as that of the target component carrier in a non-cross carrier scheduling scene;

the preset interval of the target component carrier in the cross carrier scheduling scene is the same as that of the component carrier scheduled by the target component carrier in the cross carrier scheduling scene; and the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

Preferably, candidate sets of each component carrier scheduled by the target component carrier adopt the same candidate set index;

or, the candidate sets of each component carrier scheduled by the target component carrier are cross-mapped in accordance with the component carrier index;

or, the candidate sets of each component carrier scheduled by the target component carrier are sequentially mapped in accordance with the component carrier index.

Preferably, when performing cross carrier scheduling, the UE-specific search space is generated by adopting the following way:

$$L\left\{\left(Y_k + n_{CI} + \left\lfloor \frac{m \times N_{ECCE}}{L \times M_{set}^{(L)}} \right\rfloor\right) \bmod \lfloor N_{eCCE}/L \rfloor\right\} + i,$$

or, $$L\left\{\left(Y_k + \left\lfloor \frac{(n_{CI} \times M_{set}^{(L)} + m) \times N_{ECCE}}{L \times M_{set}^{(L)} \times N_{CC}^{Num}} \right\rfloor\right) \bmod \lfloor N_{eCCE}/L \rfloor\right\} + i,$$

or, $$L\left\{\left(Y_k + \left\lfloor \frac{(n_{CI} + m \times N_{CC}^{Num}) \times N_{ECCE}}{L \times M_{set}^{(L)} \times N_{CC}^{Num}} \right\rfloor\right) \bmod \lfloor N_{eCCE}/L \rfloor\right\} + i,$$

or, $$\left\{\left(Y_k + \left\lfloor \frac{(n_{CI} \times M_{set}^{(L)} + m + G) \times N_{ECCE}}{L \times Z \times N_{CC}^{Num}} \right\rfloor\right) \bmod \lfloor N_{eCCE}/L \rfloor\right\} + i,$$

$X = (M_{set}^{(L)} + 1) \bmod 2,$ $Z = M_{set}^{(L)} + X,$ $G$ is 0 or $X$;

or, $$\left\{\left(Y_k + n_{CI} + \left\lfloor \frac{(m + G) \times N_{ECCE}}{L \times Z} \right\rfloor\right) \bmod \lfloor N_{eCCE}/L \rfloor\right\} + i,$$

-continued $$X = (M_{set}^{(L)} + 1) \bmod 2,$$

$$Z = M_{set}^{(L)} + X, G \text{ is } 0 \text{ or } X;$$

or, $$\{N_{eCCE}^{RB} \times (\lfloor A/N_{eCCE}^{RB} \rfloor + n_{CI}) + L \times (Y_k + m + n_{CI}) \bmod \lfloor N_{eCCE}^{RB}/L \rfloor\} + i,$$

$$A = L\left\{\left(Y_k + \left\lfloor \frac{m \times N_{ECCE}}{L \times M_{set}^{(L)}} \right\rfloor\right) \bmod \lfloor N_{eCCE}/L \rfloor\right\},$$

or, the way for generating the UE-specific search space when performing the cross carrier scheduling is the same as that for generating the UE-specific search space when performing non-cross carrier scheduling, and the resource sets corresponding the UE-specific search spaces of all component carriers scheduled by the target component carrier are configured by different signallings.

Preferably, wherein when performing non-cross carrier scheduling, the UE-specific search space is generated by adopting the following way:

$$L\left\{\left(Y_k + \left\lfloor \frac{m \times N_{ECCE}}{L \times M_{set}^{(L)}} \right\rfloor\right) \bmod \lfloor N_{eCCE}/L \rfloor\right\} + i,$$

or, $$\left\{\left(Y_k + \left\lfloor \frac{(m+X) \times N_{ECCE}}{L \times Z} \right\rfloor\right) \bmod \lfloor N_{eCCE}/L \rfloor\right\} + i,$$

$$X = (M_{set}^{(L)} + 1) \bmod 2,$$

$$Z = M_{set}^{(L)} + X,$$

or, $$\{N_{eCCE}^{RB} \times \lfloor A/N_{eCCE}^{RB} \rfloor + L \times (Y_k + m) \bmod \lfloor N_{eCCE}^{RB}/L \rfloor\} + i,$$

$$A = L\left\{\left(Y_k + \left\lfloor \frac{m \times N_{ECCE}}{L \times M_{set}^{(L)}} \right\rfloor\right) \bmod \lfloor N_{eCCE}/L \rfloor\right\}.$$

Preferably, this method further includes: making initial positions of the UE-specific search space corresponding to the same resource set index of all component carriers configured to the UE to adopt the same configuration or separate configurations.

Making the initial positions of the UE-specific search space corresponding to the same resource set index of the component carriers to adopt separate configurations includes:

the initial position on a sub-frame k is: $Y_k = (A \cdot Y_{k-1}) \bmod D$, $Y_{-1} = n_{RNTI} \neq 0$, A=39827, 39829, 39825, 39823 39821, 39831 or 39837, D=65537, $k = \lfloor n_s/2 \rfloor$, $\lfloor \rfloor$ represents rounding down, $n_s$ represents a timeslot number in one radio frame, $n_{RNTI}$ represents a RNTI corresponding to the UE, wherein different component carriers correspond to different values of A;

or, the initial position on the sub-frame k is: $Y_k = (A \cdot Y_{k-1}) \bmod D$, $Y_{-1} = n_{RNTI} + n_{CI} \times 2^{17} + s \times 2^{16} \neq 0$, or $Y_{-1} = n_{RNTI} + n_{CI} \times 2^{16} + s \times 2^{19} \neq 0$, or, $Y_{-1} = n_{RNTI} + n_{CI} \times 2^{16} \neq 0$, A=39827, 39829, 39825, 39823, 39821, 39831 or 39837, D=65537, $k = \lfloor n_s/2 \rfloor$, $\lfloor \rfloor$ represents rounding down, $n_s$ represents the timeslot number in one radio frame, $n_{RNTI}$ represents the RNTI corresponding to the UE, $n_{CI}$ represents the component carrier index, s represents the resource set index;

or, the initial position on the sub-frame k is: $Y'_k = Y_k + n_{CI}$, or, $Y'_k = Y_k + n_{CI} \times 2 + s$, wherein $Y_k = (A \cdot Y_{k-1}) \bmod D$, $Y_{-1} = n_{RNTI}$ A=39827, 39829, 39825, 39823, 39821, 39831 or 39837, D=65537, $k = \lfloor n_s/2 \rfloor$, $\lfloor \rfloor$ represents rounding down, $n_s$ represents the timeslot number in one radio frame, $n_{RNTI}$ represents the RNTI corresponding to the UE, $n_{CI}$ represents the component carrier index, and s represents the resource set index.

Preferably, this method further includes: determining, in a TDD system, an ARO scope of a PUCCH resource corresponding to a PDSCH scheduled by the ePDCCH according to preset information, wherein the preset information includes at least one of the followings:

a sub-frame index; and the number of downlink sub-frames corresponding to an uplink sub-frame in which the PUCCH is located.

The ARO scope corresponds to n sets, n is 2, 3, 4, 5, 6, 7, 8 or 9.

Preferably, this method further includes: determining a value of the ARO according to a position h of a downlink sub-frame index k in which the ePDCCH is located in a downlink sub-frame window corresponding to the uplink sub-frame in which the PUCCH is located, wherein h is numbered from 0, which specifically includes:

h is 0, then the ARO is {2, −1, 0, −2}, h is 1, then the ARO is {2, 0, −1, −$N_{eCCE(k-1, j)}$} or {2, 0, −2, −$N_{eCCE(k-1, j)}$}, h is 2, then the ARO is {2, 0, −$N_{eCCE(k-2, j)}$−$N_{eCCE(k-1, j)}$, −$N_{eCCE(k-1, j)}$}, h is 3, then the ARO is {2, 0, −$N_{eCCE(k-3, j)}$−$N_{eCCE(k-2, j)}$−$N_{eCCE(k-1, j)}$, −$N_{eCCE(k-2, j)}$−$N_{eCCE(k-1, j)}$};

or, the ARO corresponding to a first sub-frame is {−2, 2, −1, 0}, the ARO corresponding to a last sub-frame is {2, 0, −$N_{eCCE(k-1, j)}$, −$N_{eCCE(k-2, j)}$−$N_{eCCE(k-1, j)}$}, the ARO corresponding to other sub-frames is {2, 0, −$N_{eCCE(k-1, j)}$, $N_{eCCE(k,j)}$};

or, the ARO corresponding to the first subframe is {−2, 2, −1, 0}, the ARO corresponding to other sub-frames is {2, 0, −$N_{eCCE(k-1, j)}$, $N_{eCCE(k,j)}$};

or, the ARO corresponding to the first sub-frame is {−2, 2, −1, 0}, the ARO corresponding to other sub-frames is {2, 0, −$N_{eCCE(k-1, j)}$, −$N_{eCCE(k-1, j)}$−$N_{eCCE(k,j)}$};

or, the ARO is {0, 2, $\lfloor D1 \times T1 \rfloor$+T3, $\lfloor D2 \times T2 \rfloor$+T4} or {0, 2, $\lceil D1 \times T1 \rceil$+T3, $\lceil D2 \times T2 \rceil$+T4}, wherein T1 and T2 are real numbers, T3 and T4 are integers, D1 is $$\sum_{k=h-T_5}^{h-1} N_{eCCE(k,j)}$$

or a first preset value, D2 is $$\sum_{k=h-T_6}^{h-1} N_{eCCE(k,j)}$$

or a second preset value, T5 and T6 are integers;
or,
h is 0, then the ARO is {2, −1, 0, −2},
h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or the first preset value, D2 is $$\sum_{k=h-T_6}^{h-1} N_{eCCE(k,j)}$$

or the second preset value, T5 and T6 are integers;
or,
h is 0, then the ARO is {2, −1, 0, −2},
h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 is −1, T2 is −1, T3 is −1, T4 is −2,
D1 is $$\sum_{k=h-T_5}^{h-1} N_{eCCE(k,j)},$$

D2 is $$\sum_{k=h-T_6}^{h-1} N_{eCCE(k,j)},$$

T5 and T6 are integers;
wherein k represents the sub-frame index, and j represents a resource set index.

Figure 4:
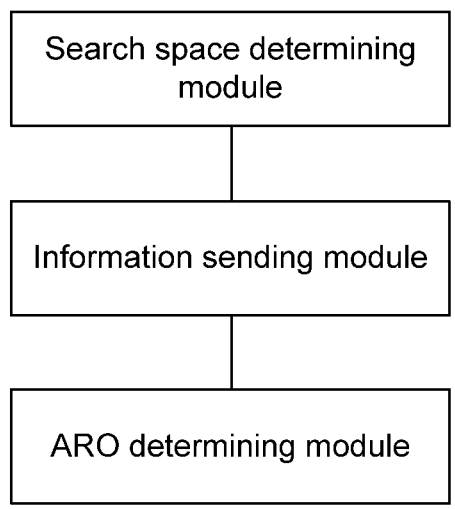
FIG. 4 is a structure diagram of a sending end of an embodiment of the disclosure.

Corresponding to the method for sending the downlink control information of the embodiment of the disclosure, the disclosure further provides an embodiment of a sending end, this sending end is located at a base station side, as shown in FIG. 4, this sending end mainly includes:

a search space determining module, configured to determine a UE-specific search space of an ePDCCH bearing downlink control information according to a preset interval;

wherein the preset interval is determined according to the number of candidate positions of one component carrier at a corresponding aggregation level in a corresponding resource set, or the preset interval is determined according to the number of the candidate positions of one component carrier at the corresponding aggregation level in the corresponding resource set, and the number of scheduled component carriers, or the preset interval is determined according to the number of the candidate positions of one component carrier at the corresponding aggregation level in the corresponding resource set, and the number of configured component carriers; and an information sending module, configured to send the downlink control information to the UE on a physical resource corresponding to the UE-specific search space of the ePDCCH.

Preferably, the search space determining module is further configured to determine the preset interval according to a component carrier index and/or a candidate set index.

Preferably, the preset interval meets at least one of the following conditions:

the preset interval of a target component carrier in a cross carrier scheduling scene is the same as that of the target component carrier in a non-cross carrier scheduling scene;

the preset interval of the target component carrier in the cross carrier scheduling scene is the same as that of the component carrier scheduled by the target component carrier in the cross carrier scheduling scene; and the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

Candidate sets of each component carrier scheduled by the target component carrier adopt the same candidate set index;

or, the candidate sets of each component carrier scheduled by the target component carrier are cross-mapped in accordance with the component carrier index;

or, the candidate sets of each component carrier scheduled by the target component carrier are sequentially mapped in accordance with the component carrier index.

Preferably, the sending end further includes: an ARO determining module configured to, determine, in a TDD system, an ARO scope of a PUCCH resource corresponding to a PDSCH scheduled by the ePDCCH according to preset information, wherein the preset information includes at least one of the followings: a sub-frame index; and the number of downlink sub-frames corresponding to an uplink sub-frame in which the PUCCH is located.

Figure 5:
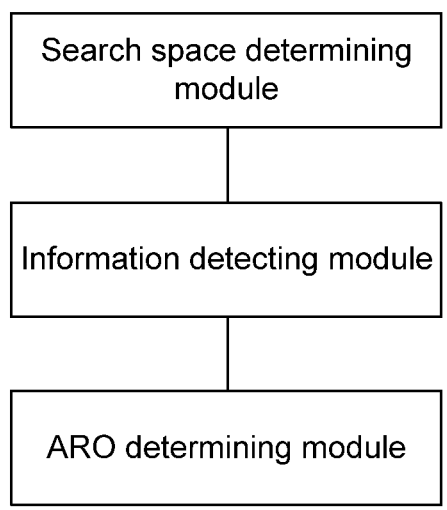
FIG. 5 is a structure diagram of a receiving end of an embodiment of the disclosure.

Corresponding to the method for detecting the downlink control information of the embodiment of the disclosure, the disclosure further provides an embodiment of a receiving end, this receiving end is located at a UE side, as shown in FIG. 5, this receiving end mainly includes:

a search space determining module, configured to determine a UE-specific search space of an ePDCCH bearing downlink control information according to a preset interval;

wherein the preset interval is determined according to the number of candidate positions of one component carrier at a corresponding aggregation level in a corresponding resource set, or the preset interval is determined according to the number of the candidate positions of one component carrier at the corresponding aggregation level in the corresponding resource set, and the number of scheduled component carriers, or the preset interval is determined according to the number of the candidate positions of one component carrier at the corresponding aggregation level in the corresponding resource set, and the number of configured component carriers; and an information detecting module, configured to detect the downlink control information on a physical resource corresponding to the search space.

Preferably, the search space determining module is further configured to determine the preset interval according to a component carrier index and/or a candidate set index.

Preferably, the preset interval meets at least one of the following conditions:

the preset interval of a target component carrier in a cross carrier scheduling scene is the same as that of the target component carrier in a non-cross carrier scheduling scene;

the preset interval of the target component carrier in the cross carrier scheduling scene is the same as that of the component carrier scheduled by the target component carrier in the cross carrier scheduling scene; and the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

Candidate sets of each component carrier scheduled by the target component carrier adopt the same candidate set index;

or, the candidate sets of each component carrier scheduled by the target component carrier are cross-mapped in accordance with the component carrier index;

or, the candidate sets of each component carrier scheduled by the target component carrier are sequentially mapped in accordance with the component carrier index.

Preferably, the search space determining module is further configured to make initial positions of the UE-specific search space corresponding to the same resource set index of all component carriers configured to the UE to adopt the same configuration or separate configurations.

Preferably, the receiving end further includes: an ARO determining module configured to, determine, in a TDD system, an ARO scope of a PUCCH resource corresponding to a PDSCH scheduled by the ePDCCH according to preset information, wherein the preset information includes at least one of the followings:

a sub-frame index; and the number of downlink sub-frames corresponding to an uplink sub-frame in which the PUCCH is located In conclusion, the embodiment of the disclosure solves a problem about how to determine the UE-specific search space of the ePDCCH in the cross carrier scheduling scene, facilitates detection of the ePDCCH, and the embodiment of the disclosure can reduce overlap between candidate positions of each component carrier scheduled on a target component carrier, guarantee obtaining scheduling gain of the candidate position of scheduled each component carrier, and reduce a scheduling blocking rate of the ePDCCH.

Each module in the above embodiment may be implemented by adopting a form of hardware, and may also be implemented by adopting the form of a software function module, and disclosure is not limited to any specific form of combination of hardware and software. All those described above are only preferred embodiments of the disclosure, and are not used to limit the scope of protection of the disclosure, any alternation or substitution which can easily be conceived by those skilled in the art within a technical scope disclosed by the disclosure, shall be covered within the scope of protection of the disclosure.

What is claimed is:

1. A method for detecting downlink control information, comprising:

determining a User Equipment (UE)-specific search space of an enhance Physical Downlink Control Channel (ePDCCH) bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and detecting the downlink control information on a physical resource corresponding to the UE-specific search space;

wherein the preset interval meets at least one of the following conditions:

the preset interval of a target component carrier in a cross carrier scheduling scene is the same as that of the target component carrier in a non-cross carrier scheduling scene;

the preset interval of the target component carrier in the cross carrier scheduling scene is the same as that of the component carrier scheduled by the target component carrier in the cross carrier scheduling scene; and the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

2. The method for detecting the downlink control information according to claim 1, wherein when performing cross carrier scheduling, the UE-specific search space is generated by adopting the following way:

$$L\left\{\left(Y_k + n_{CI} + \left\lfloor \frac{m \times N_{ECCE}}{L \times M_{set}^{(L)}} \right\rfloor \right) \bmod \lfloor N_{eCCE}/L \rfloor \right\} + i,$$

or, $$L\left\{\left(Y_k + \left\lfloor \frac{(n_{CI} \times M_{set}^{(L)} + m) \times N_{ECCE}}{L \times M_{set}^{(L)} \times N_{CC}^{Num}} \right\rfloor \right) \bmod \lfloor N_{eCCE}/L \rfloor \right\} + i,$$

or, $$L\left\{\left(Y_k + \left\lfloor \frac{(n_{CI} + m \times N_{CC}^{Num}) \times N_{ECCE}}{L \times M_{set}^{(L)} \times N_{CC}^{Num}} \right\rfloor \right) \bmod \lfloor N_{eCCE}/L \rfloor \right\} + i,$$

or, $$\left\{\left(Y_k + \left\lfloor \frac{(n_{CI} \times M_{set}^{(L)} + m + G) \times N_{ECCE}}{L \times Z \times N_{CC}^{Num}} \right\rfloor \right) \bmod \lfloor N_{eCCE}/L \rfloor \right\} + i,$$

$X = (M_{set}^{(L)} + 1)\bmod 2,$ $Z = M_{set}^{(L)} + X,$ G is 0 or X;

or, $$\left\{\left(Y_k + n_{CI} + \left\lfloor \frac{(m + G) \times N_{ECCE}}{L \times Z} \right\rfloor \right) \bmod \lfloor N_{eCCE}/L \rfloor \right\} + i,$$

$X = (M_{set}^{(L)} + 1)\bmod 2,$ $Z = M_{set}^{(L)} + X,$ G is 0 or X;

-continued or, $\{N_{eCCE}^{RB} \times (\lfloor A/N_{eCCE}^{RB} \rfloor + n_{CI}) + L \times (Y_k + m + n_{CI}) \bmod \lfloor N_{eCCE}^{RB}/L \rfloor\} + i,$ $A = L\left\{\left(Y_k + \left\lfloor \frac{m \times N_{ECCE}}{L \times M_{set}^{(L)}} \right\rfloor\right) \bmod \lfloor N_{eCCE}/L \rfloor\right\},$ or, the way for generating the UE-specific search space when performing the cross carrier scheduling is the same as that for generating the UE-specific search space when performing non-cross carrier scheduling, and the resource sets corresponding the UE-specific search spaces of all component carriers scheduled by the target component carrier are configured by different signallings;

wherein $Y_k$ represents an initial candidate position of the UE-specific search space, $n_{CI}$ represents a component carrier index, $N_{eCCE}$ represents a total number of enhanced Control Channel Elements (eCCEs) in one resource set, L represents the aggregation level, $M_{set}^{(L)}$ represents the number of the candidate positions of one component carrier at the corresponding aggregation level in the corresponding resource set, i=0, . . . , L−1, Z=$M_{set}^{(L)}$+X, $N_{eCCE}^{RB}$ represents the number of the eCCEs contained in one resource block, $N_{CC}^{Num}$ represents the number of the component carriers scheduled on the target component carrier or represents the number of the configured component carriers, and m represents a candidate set index.

3. A method for detecting downlink control information, comprising:
   determining a User Equipment (UE)-specific search space of an enhance Physical Downlink Control Channel (ePDCCH) bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and
   detecting the downlink control information on a physical resource corresponding to the UE-specific search space;
   further comprising:
   determining, in a Time Division Duplexing (TDD) system, an Ack/Nack Resource Offset (ARO) scope of a Physical Uplink Control Channel (PUCCH) resource corresponding to a Physical Downlink Shared Channel (PDSCH) scheduled by the ePDCCH according to preset information, wherein the preset information includes at least one of the followings:
   a sub-frame index; and the number of downlink sub-frames corresponding to an uplink sub-frame in which the PUCCH is located.

4. The method for detecting the downlink control information according to claim 3, wherein the ARO scope corresponds to n sets, n is 2, 3, 4, 5, 6, 7, 8 or 9.

5. The method for detecting the downlink control information according to claim 3, further comprising: determining a value of the ARO according to a position h of a downlink sub-frame index k in which the ePDCCH is located in a downlink sub-frame window corresponding to the uplink sub-frame in which the PUCCH is located, wherein h is numbered from 0, which specifically comprises:
   h is 0, then the ARO is {2, −1, 0, −2},
   h is 1, then the ARO is {2, 0, −1, −$N_{eCCE(k-1, j)}$} or {2, 0, −2, −$N_{eCCE(k-1, j)}$},
   h is 2, then the ARO is {2, 0, −$N_{eCCE(k-2, j)}$−$N_{eCCE(k-1, j)}$, −$N_{eCCE(k-1, j)}$},
   h is 3, then the ARO is {2, 0, −$N_{eCCE(k-3, j)}$−$N_{eCCE(k-2, j)}$−$N_{eCCE(k-1, j)}$, −$N_{eCCE(k-2, j)}$−$N_{eCCE(k-1, j)}$};
   or,
   the ARO corresponding to a first sub-frame is {−2, 2, −1, 0},
   the ARO corresponding to a last sub-frame is {2, 0, −$N_{eCCE(k-1, j)}$, −$N_{eCCE(k-2, j)}$−$N_{eCCE(k-1, j)}$},
   the ARO corresponding to other sub-frames is {2, 0, −$N_{eCCE(k-1, j)}$, $N_{eCCE(k,j)}$};
   or,
   the ARO corresponding to the first sub-frame is {−2, 2, −1, 0},
   the ARO corresponding to other sub-frames is {2, 0, −$N_{eCCE(k-1, j)}$, $N_{eCCE(k,j)}$};
   or,
   the ARO corresponding to the first sub-frame is {−2, 2, −1, 0},
   the ARO corresponding to other sub-frames is {2, 0, −$N_{eCCE(k-1, j)}$, −$N_{eCCE(k-1, j)}$−$N_{eCCE(k,j)}$};
   or,
   the ARO is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or a first preset value, D2 is $$\sum_{k=h-T_6}^{h-1} N_{eCCE(k,j)}$$

or a second preset value, T5 and T6 are integers;
   or,
   h is 0, then the ARO is {2, −1, 0, −2},
   h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or the first preset value, D2 is $$\sum_{k=h-T_6}^{h-1} N_{eCCE(k,j)}$$

or the second preset value, T5 and T6 are integers;
or,
h is 0, then the ARO is {2, −1, 0, −2},
h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 is −1, T2 is −1, T3 is −1, T4 is −2, D1 is $$\sum_{k=h-T_5}^{h-1} N_{eCCE(k,j)},$$

D2 is $$\sum_{k=h-T_6}^{h-1} N_{eCCE(k,j)},$$

T5 and T6 are integers;
wherein k represents the sub-frame index, j represents a resource set index, and $N_{eCCE(k,j)}$ represents a number of eCCEs corresponding to the resource set j of the sub-frame k.

6. A method for sending downlink control information, comprising:
generating a User Equipment (UE)-specific search space of an enhanced Physical Downlink Control Channel (ePDCCH) bearing downlink control information in accordance with a preset interval; and
sending the downlink control information to a UE on a physical resource corresponding to the UE-specific search space;
wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers;
wherein the preset interval meets at least one of the following conditions:
the preset interval of a target component carrier in a cross carrier scheduling scene is the same as that of the target component carrier in a non-cross carrier scheduling scene;
the preset interval of the target component carrier in the cross carrier scheduling scene is the same as that of the component carrier scheduled by the target component carrier in the cross carrier scheduling scene; and
the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

7. A method for sending downlink control information, comprising:
generating a User Equipment (UE)-specific search space of an enhanced Physical Downlink Control Channel (ePDCCH) bearing downlink control information in accordance with a preset interval; and
sending the downlink control information to a UE on a physical resource corresponding to the UE-specific search space;
wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers;
further comprising:
in a Time Division Duplexing (TDD) system, an Ack/Nack Resource Offset (ARO) scope of a Physical Uplink Control Channel (PUCCH) resource corresponding to a Physical Downlink Shared Channel (PDSCH) scheduled by the ePDCCH according to preset information, wherein the preset information includes at least one of the followings:
a sub-frame index; and the number of downlink sub-frames corresponding to an uplink sub-frame in which the PUCCH is located.

8. The method for sending the downlink control information according to claim 7, further comprising: determining a value of the ARO according to a position h of a downlink sub-frame index k in which the ePDCCH is located in a downlink sub-frame window corresponding to the uplink sub-frame in which the PUCCH is located, wherein h is numbered from 0, which specifically comprises:
h is 0, then the ARO is {2, −1, 0, −2},
h is 1, then the ARO is {2, 0, −1, $-N_{eCCE(k-1,j)}$} or {2, 0, −2, $-N_{eCCE(k-1,j)}$},
h is 2, then the ARO is {2, 0, $-N_{eCCE(k-2,j)}-N_{eCCE(k-1,j)}$, $-N_{eCCE(k-1,j)}$},
h is 3, then the ARO is {2, 0, $-N_{eCCE(k-3,j)}-N_{eCCE(k-2,j)}-N_{eCCE(k-1,j)}$, $-N_{eCCE(k-2,j)}-N_{eCCE(k-1,j)}$};
or,
the ARO corresponding to a first sub-frame is {−2, 2, −1, 0},
the ARO corresponding to a last sub-frame is {2, 0, $-N_{eCCE(k-1,j)}$, $-N_{eCCE(k-2,j)}-N_{eCCE(k-1,j)}$},
the ARO corresponding to other sub-frames is {2, 0, $-N_{eCCE(k-1,j)}$, $N_{eCCE(k,j)}$};
or,
the ARO corresponding to the first sub-frame is {−2, 2, −1, 0},
the ARO corresponding to other sub-frames is {2, 0, $-N_{eCCE(k-1,j)}$, $N_{eCCE(k,j)}$};
or,
the ARO corresponding to the first sub-frame is {−2, 2, −1, 0},
the ARO corresponding to other sub-frames is {2, 0, $-N_{eCCE(k-1,j)}$, $-N_{eCCE(k-1,j)}-N_{eCCE(k,j)}$};

or,
the ARO is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or a first preset value, D2 is $$\sum_{k=h-T_6}^{h-1} N_{eCCE(k,j)}$$

or a second preset value, T5 and T6 are integers;
or,
h is 0, then the ARO is {2, −1, 0, −2},
h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or the first preset value, D2 is $$\sum_{k=h-T_6}^{h-1} N_{eCCE(k,j)}$$

or the second preset value, T5 and T6 are integers;
or,
h is 0, then the ARO is {2, −1, 0, −2},
h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 is −1, T2 is −1, T3 is −1, T4 is −2, D1 is $$\sum_{k=h-T_5}^{h-1} N_{eCCE(k,j)},$$

D2 is $$\sum_{k=h-T_6}^{h-1} N_{eCCE(k,j)},$$

T5 and T6 are integers;
wherein k represents the sub-frame index, j represents a resource set index, and $N_{eCCE(k,j)}$ represents a number of eCCEs corresponding to the resource set j of the sub-frame k.

9. The method for sending the downlink control information according to claim 7, wherein when performing cross carrier scheduling, the UE-specific search space is generated by adopting the following way:

$$L\left\{\left(Y_k + n_{CI} + \left\lfloor \frac{m \times N_{ECCE}}{L \times M_{set}^{(L)}} \right\rfloor\right) \bmod \lfloor N_{eCCE}/L \rfloor\right\} + i,$$

or, $$L\left\{\left(Y_k + \left\lfloor \frac{(n_{CI} \times M_{set}^{(L)} + m) \times N_{ECCE}}{L \times M_{set}^{(L)} \times N_{CC}^{Num}} \right\rfloor\right) \bmod \lfloor N_{eCCE}/L \rfloor\right\} + i,$$

or, $$L\left\{\left(Y_k + \left\lfloor \frac{(n_{CI} + m \times N_{CC}^{Num}) \times N_{ECCE}}{L \times M_{set}^{(L)} \times N_{CC}^{Num}} \right\rfloor\right) \bmod \lfloor N_{eCCE}/L \rfloor\right\} + i,$$

or, $$\left\{\left(Y_k + \left\lfloor \frac{(n_{CI} \times M_{set}^{(L)} + m + G) \times N_{ECCE}}{L \times Z \times N_{CC}^{Num}} \right\rfloor\right) \bmod \lfloor N_{eCCE}/L \rfloor\right\} + i,$$

$X = (M_{set}^{(L)} + 1) \bmod 2,$ $Z = M_{set}^{(L)} + X,$ G is 0 or X;

or, $$\left\{\left(Y_k + n_{CI} + \left\lfloor \frac{(m+G) \times N_{ECCE}}{L \times Z} \right\rfloor\right) \bmod \lfloor N_{eCCE}/L \rfloor\right\} + i,$$

$X = (M_{set}^{(L)} + 1) \bmod 2,$ $Z = M_{set}^{(L)} + X,$ G is 0 or X;

or, $\{N_{eCCE}^{RB} \times (\lfloor A/N_{eCCE}^{RB} \rfloor + n_{CI}) + L \times (Y_k + m + n_{CI}) \bmod \lfloor N_{eCCE}^{RB}/L \rfloor\} + i,$ $$A = L\left\{\left(Y_k + \left\lfloor \frac{m \times N_{ECCE}}{L \times M_{set}^{(L)}} \right\rfloor\right) \bmod \lfloor N_{eCCE}/L \rfloor\right\},$$

or, when performing the cross carrier scheduling the way for generating the UE-specific search space is the same as that for generating the UE-specific search space when performing non-cross carrier scheduling, and the resource sets corresponding the UE-specific search space of all component carriers scheduled by the target component carrier are configured by different signallings;

wherein $Y_k$ represents an initial candidate position of the UE-specific search space, $n_{CI}$ represent a component carrier index, $N_{eCCE}$ represents a total number of enhanced Control Channel Elements (eCCEs) in one resource set, L represents the aggregation level, $M_{set}^{(L)}$ represents the number of the candidate positions of one component carrier at the corresponding aggregation level in the corresponding resource set, i=0, . . . , L−1, $Z=M_{set}^{(L)}+X$, $N_{eCCE}^{RB}$ represents the number of the eCCEs contained in one resource block, $N_{CC}^{Num}$ represents the number of the component carriers scheduled on the target component carrier or represents the number of configured component carriers, and m represents a candidate set index.

10. A receiving end, comprising:
a memory storing programming instructions; and
a processor configured to be capable of executing the stored programming instructions to:
determine a User Equipment (UE)-specific search space of an enhance Physical Downlink Control Channel (ePDCCH) bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and detect the downlink control information on a physical resource corresponding to the UE-specific search space;

wherein the preset interval meets at least one of the following conditions:

the preset interval of a target component carrier in a cross carrier scheduling scene is the same as that of the target component carrier in a non-cross carrier scheduling scene;

the preset interval of the target component carrier in the cross carrier scheduling scene is the same as that of the component carrier scheduled by the target component carrier in the cross carrier scheduling scene; and the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

11. The receiving end according to claim 10, wherein when performing cross carrier scheduling, the UE-specific search space is generated by adopting the following way:

$$L\left\{\left(Y_k + n_{CI} + \left\lfloor \frac{m \times N_{ECCE}}{L \times M_{set}^{(L)}} \right\rfloor\right) \bmod \lfloor N_{eCCE}/L \rfloor\right\} + i,$$

or, $$L\left\{\left(Y_k + \left\lfloor \frac{(n_{CI} \times M_{set}^{(L)} + m) \times N_{ECCE}}{L \times M_{set}^{(L)} \times N_{CC}^{Num}} \right\rfloor\right) \bmod \lfloor N_{eCCE}/L \rfloor\right\} + i,$$

or, $$L\left\{\left(Y_k + \left\lfloor \frac{(n_{CI} + m \times N_{CC}^{Num}) \times N_{ECCE}}{L \times M_{set}^{(L)} \times N_{CC}^{Num}} \right\rfloor\right) \bmod \lfloor N_{eCCE}/L \rfloor\right\} + i,$$

or, $$\left\{\left(Y_k + \left\lfloor \frac{(n_{CI} \times M_{set}^{(L)} + m + G) \times N_{ECCE}}{L \times Z \times N_{CC}^{Num}} \right\rfloor\right) \bmod \lfloor N_{eCCE}/L \rfloor\right\} + i,$$

$X = (M_{set}^{(L)} + 1)\bmod 2,$ $Z = M_{set}^{(L)} + X, G$ is 0 or $X$;

or, $$\left\{\left(Y_k + n_{CI} + \left\lfloor \frac{(m + G) \times N_{ECCE}}{L \times Z} \right\rfloor\right) \bmod \lfloor N_{eCCE}/L \rfloor\right\} + i,$$

$X = (M_{set}^{(L)} + 1)\bmod 2,$ $Z = M_{set}^{(L)} + X, G$ is 0 or $X$;

or, $$\{N_{eCCE}^{RB} \times (\lfloor A/N_{eCCE}^{RB} \rfloor + n_{CI}) + L \times (Y_k + m + n_{CI}) \bmod \lfloor N_{eCCE}^{RB}/L \rfloor\} + i,$$

$$A = L\left\{\left(Y_k + \left\lfloor \frac{m \times N_{ECCE}}{L \times M_{set}^{(L)}} \right\rfloor\right) \bmod \lfloor N_{eCCE}/L \rfloor\right\},$$

or, the way for generating the UE-specific search space when performing the cross carrier scheduling is the same as that for generating the UE-specific search space when performing non-cross carrier scheduling, and the resource sets corresponding the UE-specific search spaces of all component carriers scheduled by the target component carrier are configured by different signallings;

wherein $Y_k$ represents an initial candidate position of the UE-specific search space, $n_{CI}$ represents a component carrier index, $N_{eCCE}$ represents a total number of enhanced Control Channel Elements (eCCEs) in one resource set, L represents the aggregation level, $M_{set}^{(L)}$ represents the number of the candidate positions of one component carrier at the corresponding aggregation level in the corresponding resource set, i=0, ..., L−1, $Z=M_{set}^{(L)}+X$, $N_{eCCE}^{RB}$ represents the number of the eCCEs contained in one resource block, $N_{CC}^{Num}$ represents the number of the component carriers scheduled on the target component carrier or represents the number of the configured component carriers, and m represents a candidate set index.

12. A receiving end, comprising:
a memory storing programming instructions; and
a processor configured to be capable of executing the stored programming instructions to:
determine a User Equipment (UE)-specific search space of an enhance Physical Downlink Control Channel (ePDCCH) bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and detect the downlink control information on a physical resource corresponding to the UE-specific search space;

wherein the processor is further configured to be capable of executing the stored programming instructions to determine, in a Time Division Duplexing (TDD) system, an ARO scope of a Physical Uplink Control Channel (PUCCH) resource corresponding to a Physical Downlink Shared Channel (PDSCH) scheduled by the ePDCCH according to preset information, wherein the preset information includes at least one of the followings:

a sub-frame index; and the number of downlink sub-frames corresponding to an uplink sub-frame in which the PUCCH is located.

13. The receiving end according to claim 12, wherein the ARO scope corresponds to n sets, n is 2, 3, 4, 5, 6, 7, 8 or 9.

14. The receiving end according to claim 12, wherein the processor is further configured to be capable of executing the stored programming instructions to determine a value of the ARO according to a position h of a downlink sub-frame index k in which the ePDCCH is located in a downlink sub-frame window corresponding to the uplink sub-frame in which the PUCCH is located, wherein h is numbered from 0, which specifically comprises:

h is 0, then the ARO is {2, −1, 0, −2}, h is 1, then the ARO is {2, 0, −1, −$N_{eCCE(k-1,j)}$} or {2, 0, −2, −$N_{eCCE(k-1,j)}$}, h is 2, then the ARO is {2, 0, −$N_{eCCE(k-2,j)}$ −$N_{eCCE(k-1,j)}$,−$N_{eCCE(k-1,j)}$}, h is 3, then the ARO is {2, 0, −$N_{eCCE(k-3,j)}$ −$N_{eCCE(k-2,j)}$ −$N_{eCCE(k-1,j)}$, −$N_{eCCE(k-2,j)}$ −$N_{eCCE(k-1,j)}$};

or, the ARO corresponding to a first sub-frame is {−2, 2, −1, 0}, the ARO corresponding to a last sub-frame is {2, 0, −$N_{eCCE(k-1,j)}$, −$N_{eCCE(k-2,j)}$ −$N_{eCCE(k-1,j)}$}, the ARO corresponding to other sub-frames is {2, 0, −$N_{eCCE(k-1,j)}$, $N_{eCCE(k,j)}$};

or, the ARO corresponding to the first sub-frame is {−2, 2, −1, 0}, the ARO corresponding to other sub-frames is {2, 0, −$N_{eCCE(k-1,j)}$, $N_{eCCE(k,j)}$};

or, the ARO corresponding to the first sub-frame is {−2, 2, −1, 0}, the ARO corresponding to other sub-frames is {2, 0, −$N_{eCCE(k-1,j)}$, −$N_{eCCE(k-1,j)}$ −$N_{eCCE(k,j)}$};

or, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or a first preset value, D2 is $$\sum_{k=h-T_6}^{h-1} N_{eCCE(k,j)}$$

or a second preset value, T5 and T6 are integers;

or, h is 0, then the ARO is {2, −1, 0, −2}, h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 and T2 are real numbers, T3 and T4 are integers, D1 is $$\sum_{k=h-T_5}^{h-1} N_{eCCE(k,j)}$$

or the first preset value, D2 is $$\sum_{k=h-T_6}^{h-1} N_{eCCE(k,j)}$$

or the second preset value, T5 and T6 are integers;

or, h is 0, then the ARO is {2, −1, 0, −2}, h is other values, the ARO is {0, 2, ⌊D1×T1⌋+T3, ⌊D2×T2⌋+T4} or {0, 2, ⌈D1×T1⌉+T3, ⌈D2×T2⌉+T4}, wherein T1 is −1, T2 is −1, T3 is −1, T4 is −2, D1 is $$\sum_{k=h-T_5}^{h-1} N_{eCCE(k,j)},$$

D2 is $$\sum_{k=h-T_6}^{h-1} N_{eCCE(k,j)},$$

T5 and T6 are integers;

wherein k represents the sub-frame index, j represents a resource set index, and $N_{eCCE(k,j)}$ represents a number of eCCEs corresponding to the resource set j of the sub-frame k.

15. A sending end, comprising:

a memory storing programming instructions; and a processor configured to be capable of executing the stored programming instructions to:

determine a User Equipment (UE)-specific search space of an enhance Physical Downlink Control Channel (ePDCCH) bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and send the downlink control information to the UE on a physical resource corresponding to the UE-specific search space of the ePDCCH;

wherein the preset interval meets at least one of the following conditions:

the preset interval of a target component carrier in a cross carrier scheduling scene is the same as that of the target component carrier in a non-cross carrier scheduling scene;

the preset interval of the target component carrier in the cross carrier scheduling scene is the same as that of the component carrier scheduled by the target component carrier in the cross carrier scheduling scene; and the preset interval of the component carrier scheduled by the target component carrier in the cross carrier scheduling scene is determined according to the number of the candidate positions of N component carriers at the corresponding aggregation level in the corresponding resource set; the preset interval of the target component carrier in the non-cross carrier scheduling scene is determined according to the number of the candidate positions of one component carrier at the corresponding aggregation level in the corresponding resource set, wherein N is a natural number.

16. A sending end, comprising:
a memory storing programming instructions; and
a processor configured to be capable of executing the stored programming instructions to:
determine a User Equipment (UE)-specific search space of an enhance Physical Downlink Control Channel (ePDCCH) bearing downlink control information according to a preset interval; wherein the preset interval is determined according to a number of candidate positions of one component carrier at a corresponding aggregation level in a corresponding resource set, or the preset interval is determined according to the number of the candidate positions of one component carrier at the corresponding aggregation level in the corresponding resource set, and a number of scheduled component carriers, or the preset interval is determined according to the number of the candidate positions of one component carrier at the corresponding aggregation level in the corresponding resource set, and a number of configured component carriers; and
send the downlink control information to the UE on a physical resource corresponding to the UE-specific search space of the ePDCCH;
wherein the processor is further configured to be capable of executing the stored programming instructions to determine, in a Time Division Duplexing (TDD) system, an ARO scope of a Physical Uplink Control Channel (PUCCH) resource corresponding to a Physical Downlink Shared Channel (PDSCH) scheduled by the ePDCCH according to preset information, wherein the preset information includes at least one of the followings:
a sub-frame index; and the number of downlink sub-frames corresponding to an uplink sub-frame in which the PUCCH is located.

17. The sending end according to claim 16, wherein the processor is further configured to be capable of executing the stored programming instructions to determine a value of the ARO according to a position h of a downlink sub-frame index k in which the ePDCCH is located in a downlink sub-frame window corresponding to the uplink sub-frame in which the PUCCH is located, wherein h is numbered from 0, which specifically comprises:
h is 0, then the ARO is $\{2, -1, 0, -2\}$,
h is 1, then the ARO is $\{2, 0, -1, -N_{eCCE(k-1, j)}\}$ or $\{2, 0, -2, -N_{eCCE(k-1, j)}\}$,
h is 2, then the ARO is $\{2, 0, -N_{eCCE(k-2, j)} -N_{eCCE(k-1, j)} -N_{eCCE(k-1, j)}\}$,
h is 3, then the ARO is $\{2, 0, -N_{eCCE(k-3, j)} -N_{eCCE(k-2, j)} -N_{eCCE(k-1, j)}, -N_{eCCE(k-2, j)} -N_{eCCE(k-1, j)}\}$;
or,
the ARO corresponding to a first sub-frame is $\{-2, 2, -1, 0\}$,
the ARO corresponding to a last sub-frame is $\{2, 0, -N_{eCCE(k-1, j)}, -N_{eCCE(k-2, j)} -N_{eCCE(k-1, j)}\}$,
the ARO corresponding to other sub-frames is $\{2, 0, -N_{eCCE(k-1, j)}, N_{eCCE(k,j)}\}$;
or,
the ARO corresponding to the first sub-frame is $\{-2, 2, -1, 0\}$,
the ARO corresponding to other sub-frames is $\{2, 0, -N_{eCCE(k-1, j)}, N_{eCCE(k,j)}\}$;

or,
the ARO corresponding to the first sub-frame is $\{-2, 2, -1, 0\}$,
the ARO corresponding to other sub-frames is $\{2, 0, -N_{eCCE(k-1, j)}, -N_{eCCE(k-1, j)} -N_{eCCE(k,j)}\}$;
or,
the ARO is $\{0, 2, \lfloor D1 \times T1 \rfloor + T3, \lfloor D2 \times T2 \rfloor + T4\}$ or $\{0, 2, \lceil D1 \times T1 \rceil + T3, \lceil D2 \times T2 \rceil + T4\}$, wherein T1 and T2 are real numbers, T3 and T4 are integers, D1 is $$\sum_{k=h-T_5}^{h-1} N_{eCCE(k,j)}$$

or a first preset value, D2 is $$\sum_{k=h-T_6}^{h-1} N_{eCCE(k,j)}$$

or a second preset value, T5 and T6 are integers;
or,
h is 0, then the ARO is $\{2, -1, 0, -2\}$,
h is other values, the ARO is $\{0, 2, \lfloor D1 \times T1 \rfloor + T3, \lfloor D2 \times T2 \rfloor + T4\}$ or $\{0, 2, \lceil D1 \times T1 \rceil + T3, \lceil D2 \times T2 \rceil + T4\}$, wherein T1 and T2 are real numbers, T3 and T4 are integers, D1 is $$\sum_{k=h-T_5}^{h-1} N_{eCCE(k,j)}$$

or the first preset value, D2 is $$\sum_{k=h-T_6}^{h-1} N_{eCCE(k,j)}$$

or the second preset value, T5 and T6 are integers;
or,
h is 0, then the ARO is $\{2, -1, 0, -2\}$,
h is other values, the ARO is $\{0, 2, \lfloor D1 \times T1 \rfloor + T3, \lfloor D2 \times T2 \rfloor + T4\}$ or $\{0, 2, \lceil D1 \times T1 \rceil + T3, \lceil D2 \times T2 \rceil + T4\}$, wherein T1 is −1, T2 is −1, T3 is −1, T4 is −2, D1 is $$\sum_{k=h-T_5}^{h-1} N_{eCCE(k,j)},$$

D2 is $$\sum_{k=h-T_6}^{h-1} N_{eCCE(k,j)},$$

T5 and T6 are integers;
wherein k represents the sub-frame index, j represents a resource set index, and $N_{eCCE(k,j)}$ represents a number of eCCEs corresponding to the resource set j of the sub-frame k.

18. The sending end according to claim 16, wherein when performing cross carrier scheduling, the UE-specific search space is generated by adopting the following way:

$$L\left\{\left(Y_k + n_{CI} + \left\lfloor \frac{m \times N_{ECCE}}{L \times M_{set}^{(L)}} \right\rfloor\right) \bmod \lfloor N_{eCCE}/L \rfloor\right\} + i,$$

or, $$L\left\{\left(Y_k + \left\lfloor \frac{(n_{CI} \times M_{set}^{(L)} + m) \times N_{ECCE}}{L \times M_{set}^{(L)} \times N_{CC}^{Num}} \right\rfloor\right) \bmod \lfloor N_{eCCE}/L \rfloor\right\} + i,$$

or, $$L\left\{\left(Y_k + \left\lfloor \frac{(n_{CI} + m \times N_{CC}^{Num}) \times N_{ECCE}}{L \times M_{set}^{(L)} \times N_{CC}^{Num}} \right\rfloor\right) \bmod \lfloor N_{eCCE}/L \rfloor\right\} + i,$$

or, $$\left\{\left(Y_k + \left\lfloor \frac{(n_{CI} \times M_{set}^{(L)} + m + G) \times N_{ECCE}}{L \times Z \times N_{CC}^{Num}} \right\rfloor\right) \bmod \lfloor N_{eCCE}/L \rfloor\right\} + i,$$

$X = (M_{set}^{(L)} + 1) \bmod 2,$ $Z = M_{set}^{(L)} + X,$ $G$ is 0 or $X$;

or, $$\left\{\left(Y_k + n_{CI} + \left\lfloor \frac{(m + G) \times N_{ECCE}}{L \times Z} \right\rfloor\right) \bmod \lfloor N_{eCCE}/L \rfloor\right\} + i,$$

$X = (M_{set}^{(L)} + 1) \bmod 2,$ $Z = M_{set}^{(L)} + X,$ $G$ is 0 or $X$;

-continued or, $$\{N_{eCCE}^{RB} \times (\lfloor A/N_{eCCE}^{RB} \rfloor + n_{CI}) + L \times (Y_k + m + n_{CI}) \bmod \lfloor N_{eCCE}^{RB}/L \rfloor\} + i,$$

$$A = L\left\{\left(Y_k + \left\lfloor \frac{m \times N_{ECCE}}{L \times M_{set}^{(L)}} \right\rfloor\right) \bmod \lfloor N_{eCCE}/L \rfloor\right\},$$

or, the way for generating the UE-specific search space when performing the cross carrier scheduling is the same as that for generating the UE-specific search space when performing non-cross carrier scheduling, and the resource sets corresponding the UE-specific search spaces of all component carriers scheduled by the target component carrier are configured by different signallings;

wherein $Y_k$ represents an initial candidate position of the UE-specific search space, $n_{CI}$ represents a component carrier index, $N_{eCCE}$ represents a total number of enhanced Control Channel Elements (eCCEs) in one resource set, L represents the aggregation level, $M_{set}^{(L)}$ represents the number of the candidate positions of one component carrier at the corresponding aggregation level in the corresponding resource set, i=0, . . . , L–1, Z=$M_{set}^{(L)}$+X, $N_{eCCE}^{RB}$ represents the number of the eCCEs contained in one resource block, $N_{CC}^{Num}$ represents the number of the component carriers scheduled on the target component carrier or represents the number of the configured component carriers, and m represents a candidate set index.

\* \* \* \* \*